United States Patent
Kuriya et al.

(10) Patent No.: US 6,704,653 B2
(45) Date of Patent: Mar. 9, 2004

(54) VEHICLE BACKING SUPPORT APPARATUS

(75) Inventors: Hisashi Kuriya, Aichi (JP); Takashi Endo, Aichi (JP); Isao Suzuki, Aichi (JP); Masahiko Ando, Aichi (JP); Kazunori Shimazaki, Aichi (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/030,792

(22) PCT Filed: May 11, 2001

(86) PCT No.: PCT/JP01/03957

§ 371 (c)(1),
(2), (4) Date: Apr. 15, 2002

(87) PCT Pub. No.: WO01/85496

PCT Pub. Date: Nov. 15, 2001

(65) Prior Publication Data

US 2002/0123829 A1 Sep. 5, 2002

(30) Foreign Application Priority Data

May 12, 2000 (JP) .......................... 2000-140699
Sep. 18, 2000 (JP) .......................... 2000-281467

(51) Int. Cl.$^7$ ............................ G05D 1/00; G06F 7/00; G06F 17/00
(52) U.S. Cl. ............... 701/301; 340/425.5; 340/937; 340/988; 348/148; 701/1
(58) Field of Search .................. 701/1, 116, 301; 340/435, 425.5, 932.2, 937, 988; 725/75; 348/118, 148

(56) References Cited

U.S. PATENT DOCUMENTS

| | | | | |
|---|---|---|---|---|
| 6,344,805 B1 | * | 2/2002 | Yasui et al. | 340/932.2 |
| 6,411,867 B1 | * | 6/2002 | Sakiyama et al. | 701/1 |
| 6,424,895 B1 | * | 7/2002 | Shimizu et al. | 701/41 |
| 6,463,363 B1 | * | 10/2002 | Okuda | 701/1 |
| 2001/0026317 A1 | * | 10/2001 | Kakinami et al. | 348/148 |
| 2002/0005779 A1 | * | 1/2002 | Ishii et al. | 340/436 |

FOREIGN PATENT DOCUMENTS

| | | | | |
|---|---|---|---|---|
| JP | 59-114139 | | 7/1984 | ............ B60R/1/00 |
| JP | 10-244891 | * | 9/1998 | |
| JP | 11-157404 | * | 6/1999 | |
| JP | 11-367457 | * | 12/1999 | |
| JP | 2000-079860 | | 3/2000 | ............ B60R/21/00 |

* cited by examiner

Primary Examiner—Thomas G. Black
Assistant Examiner—Ronnie Mancho
(74) Attorney, Agent, or Firm—Morgan & Finnegan, LLP

(57) ABSTRACT

An object of the present invention is to provide a vehicle backward movement assisting apparatus during parking, in which a steering assisting guide display is performed so that a driver can easily comprehend a steering rate and time frame, a steering amount or a backward movement amount in parking a vehicle. When a vehicle starts a turn, a detecting means of a rotation speed difference between a right wheel and a left wheel detects a rotation speed difference between a right wheel and a left wheel. When the difference becomes the predetermined value or larger, it is recognized that the vehicle starts the turn. The angle speed, which is detected by a yaw rate sensor since the start of the turn, is added as a yaw angle. Then, the vehicle is stopped and a shift lever is operated so as to be set to a backward movement position, whereby the yaw angle at this time is detected as the turn angle since the time of starting the turn. An image processor displays a parallel parking guide line and a vehicle space mark so as to be inclined on the screen of a monitor based on the turn angle.

11 Claims, 21 Drawing Sheets

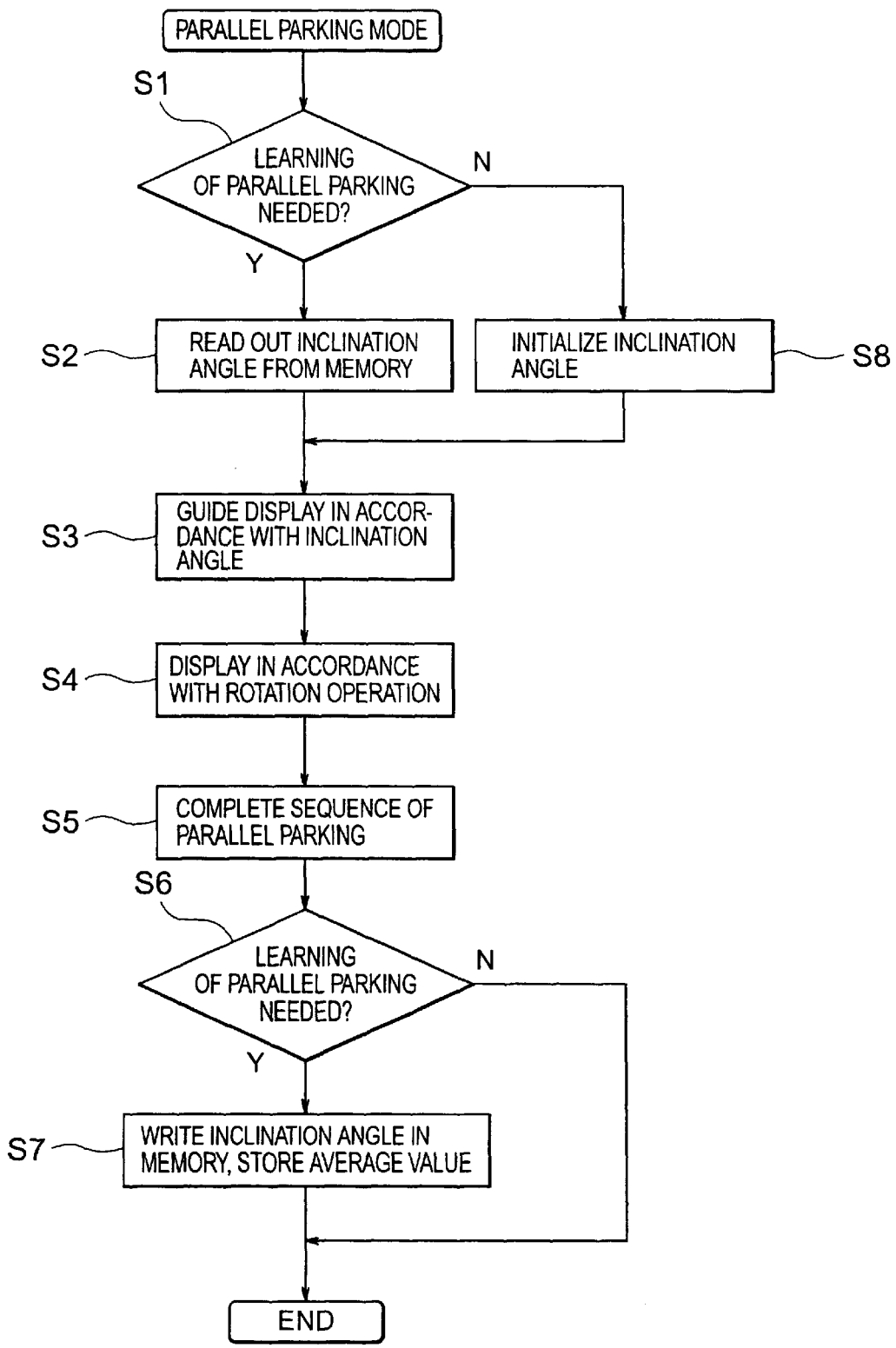

211

VEHICLE BACKING SUPPORT APPARATUS

TECHNICAL FIELD

The present invention relates to a vehicle backward movement assisting apparatus during parking, and particularly, to a device for superimposedly displaying an indicator for assisting a steering wheel operation during parking operation on a monitor screen on which the rear of a vehicle is imaged.

Also, the present invention relates to a vehicle backward movement assisting apparatus during parallel parking (in tandem), and particularly, to an apparatus for assisting a steering wheel operation in the case where a vehicle is stopped in an inclined state with respect to a parking space so as to be parked in tandem.

BACKGROUND ART

Conventionally, there has been proposed an apparatus, which displays the rear view of a vehicle on a monitor screen when a target place becomes out of sight for a driver due to a blind spot of the vehicle during a backward movement of the vehicle. For example, Japanese Patent Publication No. 2-36417 discloses a vehicle rear monitor apparatus comprising a television camera for picking up an image of the rear of a vehicle, a monitor television for displaying the image picked up by the television camera, a sensor for outputting an information signal related to a steering angle of a wheel, and a circuit for generating a marker signal in accordance with the information signal from the sensor and superimposedly displaying a marker on a television screen. In this apparatus, data on the wheel steering angle and data on marker positions along the direction in which the vehicle moves backward, which corresponds to the steering angle, are stored in a ROM. A predicted backward movement locus of the vehicle in accordance with the steering angle at that time is displayed on the television screen as a series of markers superimposed on the image picked up by the television camera.

According to this apparatus, when the vehicle moves backward, the rear view of a road condition, etc. and the predicted backward movement locus of the vehicle in accordance with the steering angle are displayed on the screen of the monitor television, so that the driver is capable of moving the vehicle backward by operating the steering wheel while the driver watches the television screen without turning the driver's head backward.

However, when the above-described conventional apparatus is used in a parallel parking or a lateral parking, there are problems as follows: in the case of parallel parking, it is difficult for the driver to determine the timing to turn the steering wheel and the steering amount, and in the case of lateral parking, it is difficult for the driver to determine what amount the vehicle is to be moved backward and the steering amount for the completion of parking. On the other hand, when the driver can know the angle relation of the vehicle with respect to a target parking space at the time of starting the parking operation, it is possible to provide a preferable guide display in parallel parking or lateral parking based on the information.

When performing parallel parking, for example, the vehicle is stopped in an inclined state with respect to a parking space and advanced into the parking space at an appropriate steering angle. Further, the steering wheel is returned in the reverse direction to guide the vehicle to a target parking position. However, in the conventional rear monitor apparatus, there is a problem in that when the driver looks only the rear view and the predicted backward movement locus of the vehicle on the television screen, it is difficult for the driver to determine what degree of steering angle the vehicle is to be advanced into the parking space at and where the steering wheel is to be returned, whereby parallel parking can not be sufficiently assisted.

Also, in the case where the vehicle is stopped for parallel parking, the degree of the angle of the vehicle with respect to a parking space depends on the habit of each driver. Therefore, it is difficult to perform the steering assist appropriate to each driver.

SUMMARY OF THE INVENTION

The present invention has been made in view of the above problem. Accordingly, an object of the present invention is to provide a vehicle backward movement assisting apparatus for displaying a steering assist guide with which a driver can easily comprehend a steering rate and time frame, a steering amount and an amount to be moved backward in parking.

Another object of the present invention is to provide a vehicle backward movement assisting apparatus capable of guiding a steering rate and a steering amount which are appropriate to each driver in parallel parking.

In order to achieve the above objects, a vehicle backward movement assisting apparatus during parking operation according to claim 1 is characterized by comprising: a camera for picking up the rear view of a vehicle; a monitor disposed at a driver's seat; a recognizing means for recognizing a start of turn of the vehicle; a detecting means for detecting a turn angle of the vehicle after the start of turn; means for indicating an acquisition of a turn angle for indicating a timing for detecting the turn angle to the means for detecting a turn angle; and means for controlling the monitor for displaying an image from the camera on the monitor while the vehicle is moving backward, and for superimposedly displaying on the monitor a guide display for assisting the vehicle drive during parking, and a guide display based on the turn angle detected by the means for detecting a turn angle.

The means for recognizing the start of a turn to a vehicle may be preferably composed of: means for detecting the rotation speed difference between a right wheel and a left wheel, a vehicle speed sensor and a steering angle sensor, or a dedicated button. The means for detecting a turn angle may be preferably composed of: a yaw rate sensor, the steering angle sensor and a travel distance sensor, or a geomagnetism sensor. The means for indicating an acquisition of a turn angle may be preferably composed of a shift lever or a dedicated button.

The guide display is one for parallel parking may include: a parallel parking guide line displayed on the monitor screen in accordance with the turn angle detected by the means for detecting a turn angle; a vehicle space mark movingly displayed along on the parallel parking guide line on the monitor screen in accordance with the steering angle of the steering wheel; and an eye mark which is fixedly displayed at a predetermined position of the monitor screen and guides a return point of the steering wheel.

A vehicle backward movement assisting apparatus during parallel parking operation according to claim 6 of the present invention comprises: a camera for picking up the rear view of a vehicle; a monitor disposed at a driver's seat; a steering angle sensor for detecting a steering angle of a steering wheel; means for controlling a display, for displaying the image by the camera on the monitor while the vehicle being moved backward, and for superimposedly displaying on the screen of the monitor a guide display for assisting the vehicle drive during parking operation; and a first switch and a second switch which are disposed at the driver's seat of the vehicle, and by which the moving guide display on the screen of the monitor is moved in parallel and rotated, respectively, characterized in that: the moving guide display includes a parallel parking guide line and a vehicle space mark displayed so as to be moved along on the parallel parking guide line in accordance with the steering angle of the steering wheel detected by the steering angle sensor; and the fixed guide display includes an eye mark, which is fixedly displayed at the predetermined position of the screen of the monitor and which guides a return point of the steering wheel; and the means for controlling a display learns and stores the past rotation angle of the moving guide display made by the second switch and represents the moving guide display on the screen of the monitor at the stored rotation angle.

In the apparatus, the image of the rear of a vehicle, which is picked up by the camera when the vehicle is moved backward, is displayed on the monitor, and the moving guide display and the fixed guide display are superimposedly displayed on the monitor screen as the guide displays during parallel parking operation. The past rotation angle of the moving guide display by the second switch is learned and stored, and the moving guide display is represented on the monitor screen at the stored rotation angle. That is, the moving guide display appropriate to a driver is provided.

A vehicle backward movement assisting apparatus during parallel parking operation according to claim 7 of the present invention, in the apparatus according to claim 6, comprises the steps of: operating the second switch in the stop position of a vehicle to adjust the inclination of a parallel parking guide line and the inclination of a vehicle space mark to a target regarding a parking space on the monitor screen; operating the first switch to superimpose the parallel parking guide line on the target regarding the parking space on the monitor screen; returning a steering wheel for superimposing the vehicle space mark on the parking space; moving the vehicle backward while retaining the steering wheel at the position; stopping the vehicle at the position where the eye mark is superimposed on the parking space; moving the vehicle backward during a static turn so that the steering angle becomes maximum in a reverse direction; and appropriately performing parallel parking of the vehicle at the parking space.

In the apparatus, at the stop position of the vehicle, the second switch is operated until the inclination of the parallel parking guide line and the inclination of the vehicle space mark are adjusted to the target regarding the parking space. Then, the first switch is operated until the parallel parking guide line is superimposed on the target regarding the parking space. Further, the steering wheel is returned to where the vehicle space mark is superimposed on the parking space, and the vehicle is moved backward while holding the steering wheel in the state. When the eye mark is superimposed on the target point, next, the position is recognized to be a return point of the steering wheel, resulting in stopping the vehicle. When the vehicle is moved backward during a static turn so that the steering angle becomes maximum in a reverse direction, the vehicle is appropriately parked in parallel at the parking space.

A vehicle backward movement assisting apparatus during parallel parking operation according to claim 8, in the apparatus according to claim 6 or 7, comprises a right-or-left selection switch which is disposed at the driver's seat of the vehicle, for selecting one of a left parallel parking and a right parallel parking, in which the means for controlling the display represents on the monitor screen the moving guide display and the fixed guide display for the parallel parking selected by the right-or-left selection switch.

In the apparatus, when one of the left parallel parking and the right parallel is selected by the right-or-left selection switch, the moving guide display and the fixed guide display used for the selected parallel parking are displayed on the monitor screen.

In a vehicle backward movement assisting apparatus during parallel parking operation according to claim 9, in the apparatus according to claim 6 or 7, the means for controlling a display represents the moving guide display and the fixed guide display used for one of a right parallel parking and a left parallel parking with a high priority on the monitor screen, thereafter the means judges whether the direction of parallel parking is a right one or a left one, based on the steering angle detected by the steering angle sensor, and further in the case where the parallel parking is performed in a direction different from that in case of the moving guide display and the fixed guide display displayed with a higher priority, the moving guide display and the fixed guide display of the other direction are displayed on the monitor screen.

In the apparatus, first, the moving guide display and the fixed guide display used for one of the right parallel parking and the left parallel parking are displayed with a high priority on the monitor screen. Thereafter, whether the direction of parallel parking is a right one or a left one is judged based on the value detected by the steering angle sensor. In the case where the parallel parking is performed in a direction different from that in case of the moving guide display and the fixed guide display displayed with a higher priority, the apparatus changes to the moving guide display and the fixed guide display of the other direction are displayed on the monitor screen.

A vehicle backward movement assisting apparatus during parallel parking operation according to claim 10, in the apparatus according to claim 6 or 7, comprises a yaw rate sensor for detecting the yaw rate of a vehicle, in which the means for controlling a display judges whether the direction of parallel parking is a right one or a left one in accordance with the angle change of a vehicle in a predetermined time required for stopping for performing parallel parking, based on the yaw rate detected by the yaw rate sensor, and the moving guide display and the fixed guide display of parallel parking in the judged direction are displayed on the monitor screen.

In the apparatus, whether the direction of parallel parking is a right one or a left one is judged in accordance with the angle change of a vehicle in the predetermined time required for stopping the vehicle for performing parallel parking, based on the yaw rate detected by the yaw rate sensor. Then the moving guide display and the fixed guide display of parallel parking in the judged direction are displayed on the monitor screen.

BRIEF DESCRIPTION OF THE DRAWINGS

FIG. 11 is a flowchart showing operations according to Embodiment 6.

BEST MODE FOR CARRYING OUT THE INVENTION

Embodiments according to the present invention will be described below with reference to attached drawings.

Embodiment 1

Figure 1:
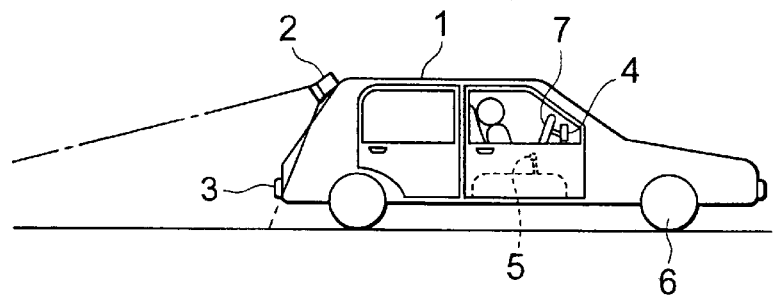
FIG. 1 is a side view showing a vehicle equipped with a vehicle backward movement assisting apparatus according to the present invention.

As shown in FIG. 1, a camera 2 for picking up the rear view of a vehicle 1 is installed at the rear portion of the vehicle 1. A rear portion bumper 3 of the vehicle 1 is disposed at a side end portion close to the view range of the camera 2. A monitor 4 composed of a color type liquid crystal display is disposed at the driver's seat of the vehicle 1. The monitor 4 is usually used as a display device of a navigation apparatus, and is structured so that the image picked up by the camera 2 is displayed thereon when a shift lever 5 provided at the driver's seat is operated to target a backward movement position. The front wheels 6 as steered wheels are steered by operating a steering wheel 7.

Figure 2:
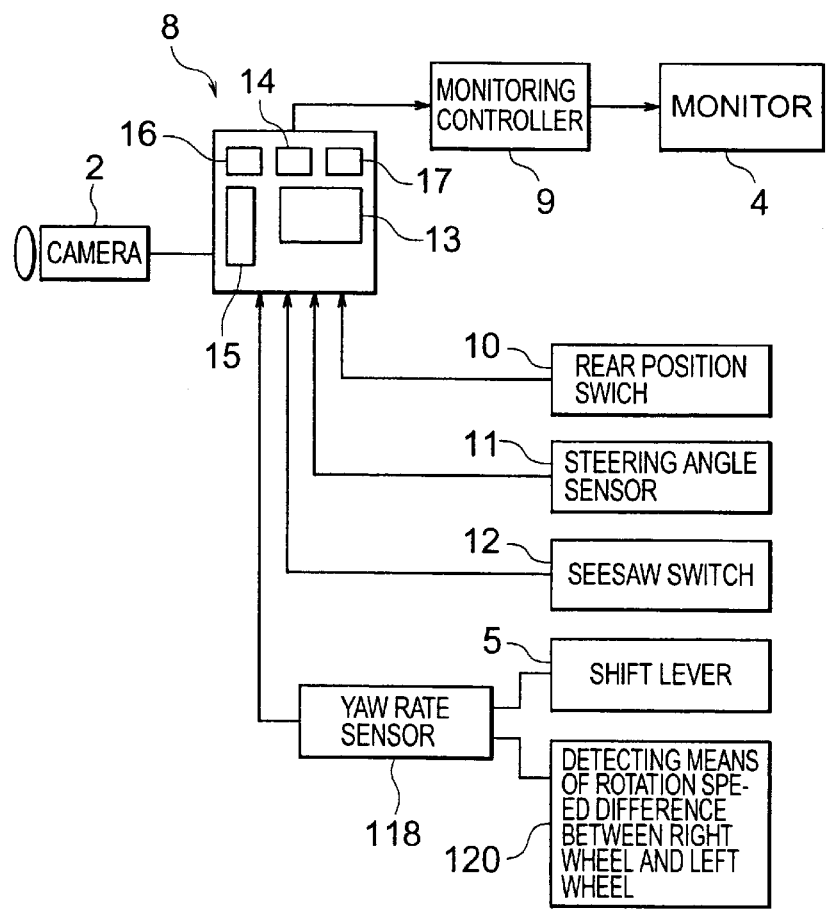
FIG. 2 is a block diagram showing a structure of the vehicle backward movement assisting apparatus according to Embodiment 1.

FIG. 2 shows the structure of a vehicle backward movement assisting apparatus during parallel parking operation according to Embodiment 1 of the present invention. The camera 2 is connected to an image processor 8. The image processor 8 is connected to the monitor 4 via a monitoring controller 9. The vehicle 1 is provided with a rear position switch 10 for detecting whether the shift lever 5 is changed to the backward movement position. A steering angle sensor 11 for detecting a steering angle θ of the steering wheel 7 is installed to a steering shaft of the steering wheel 7. Also, at the driver's seat, a seesaw switch 12 to be a parallel parking guide line moving switch employed for moving a parallel parking guide line described below on the monitor 4 is disposed. The rear position switch 10, the steering angle sensor 11 and the seesaw switch 12 are respectively connected to the image processor 8.

In addition, the image processor 8 is connected to a yaw rate sensor 118 as a turn angle detecting means. The yaw rate sensor 118 is connected to the shift lever 5 functioning even as an indicating means of a turn angle acquisition which indicates the timing for detecting the turn angle of a vehicle, and a detecting means of a rotation speed difference between a right wheel and a left wheel 120 for recognizing the start of turn of a vehicle. Note that the detecting means of a rotation speed difference between a right wheel and a left wheel 120 can be composed of, for example, two rotation speed sensors respectively installed on the left wheel and the right wheel.

A display signal is usually input from a navigation apparatus (not shown) so to be displayed on the monitor 4. However, when a display signal is input from the image processor 8, the monitoring controller 9 conducts the display on the monitor 4 based on the display signal from the image processor 8.

The image processor 8 is provided with a CPU 13, a ROM 14 storing the control program, an image processing processor 15 processing image data picked up by the camera 2, an image memory 16 storing image data processed by the image processing processor 15, and an operation RAM 17. The display controlling means according to the present invention is composed of the image processor 8, the monitoring controller 9 and the rear position switch 10.

Figure 3A:
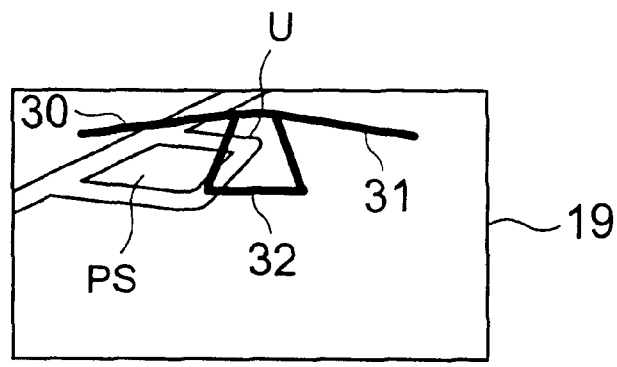
FIG. 3 is diagrams stepwise and schematically showing a monitor screen during parallel parking operation according to Embodiment 1.
Figure 3B:
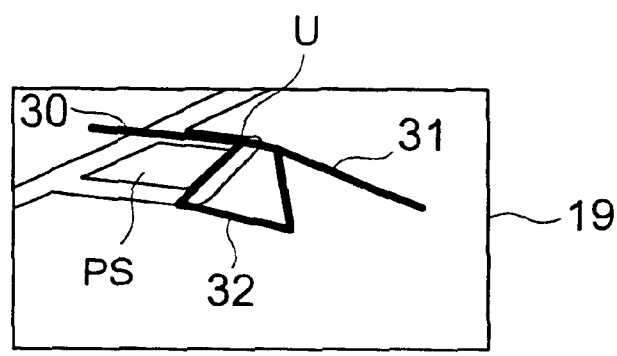

The CPU 13 is operated based on the control program stored in the ROM 14. When the shift lever 5 is changed to the backward movement position by the rear position switch 10 and the advance into a parallel parking mode is detected, as shown in FIG. 3A, a display data is created in a predetermined cycle on a screen 19 of the monitor 14, in which a pair of parallel parking guide lines 30 and 31 disposed symmetric to the right and left and a rectangular vehicle space mark 32 disposed therebetween are superimposedly displayed on the image picked by the camera 2. As shown in FIG. 3B, the parallel parking guide lines 30 and 31 and the vehicle space mark 32 are flexibly movable in a vertical direction on the screen 19 of the monitor 4 by operating the seesaw switch 12 disposed at the driver's seat.

Figure 3C:
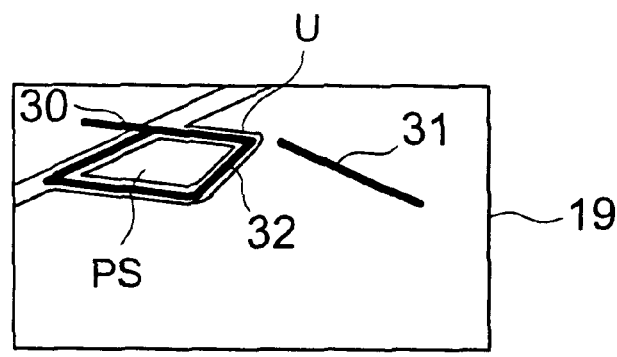

Further, the CPU 13 displays and moves the vehicle space mark 32 along on one of the parallel parking guide lines 30 and 31 of the screen 19 of the monitor 4 in accordance with the steering angle θ of the steering wheel 7 at that time based on the output signal of the steering angle sensor 11. For example, when the steering wheel 7 is returned leftward, as shown in FIG. 3C, the vehicle space mark 32 is moved leftward along on the parallel parking guide line 30 on the left side of the screen. When the steering wheel 7 is returned rightward, the vehicle space mark 32 is moved in a right direction along on the parallel parking guide line 31 on the right side of the screen.

Figure 3D:
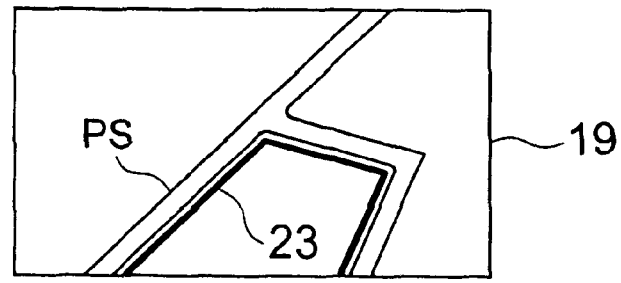

Also, as shown in FIG. 3D, the CPU 13 creates a display data in a predetermined cycle, in which an eye mark 23 informing a driver of the return timing of the steering wheel 7 is superimposedly displayed on the image picked up by the camera 2 to be displayed. The eye mark 23 includes a shape in accordance with the predicted parking position at the time of backward movement of the vehicle 1 in the state that the steering wheel 7 is returned. When the eye mark 23 is superimposed on a target parking space PS, a driver is informed that the position is the return position.

Figure 4:
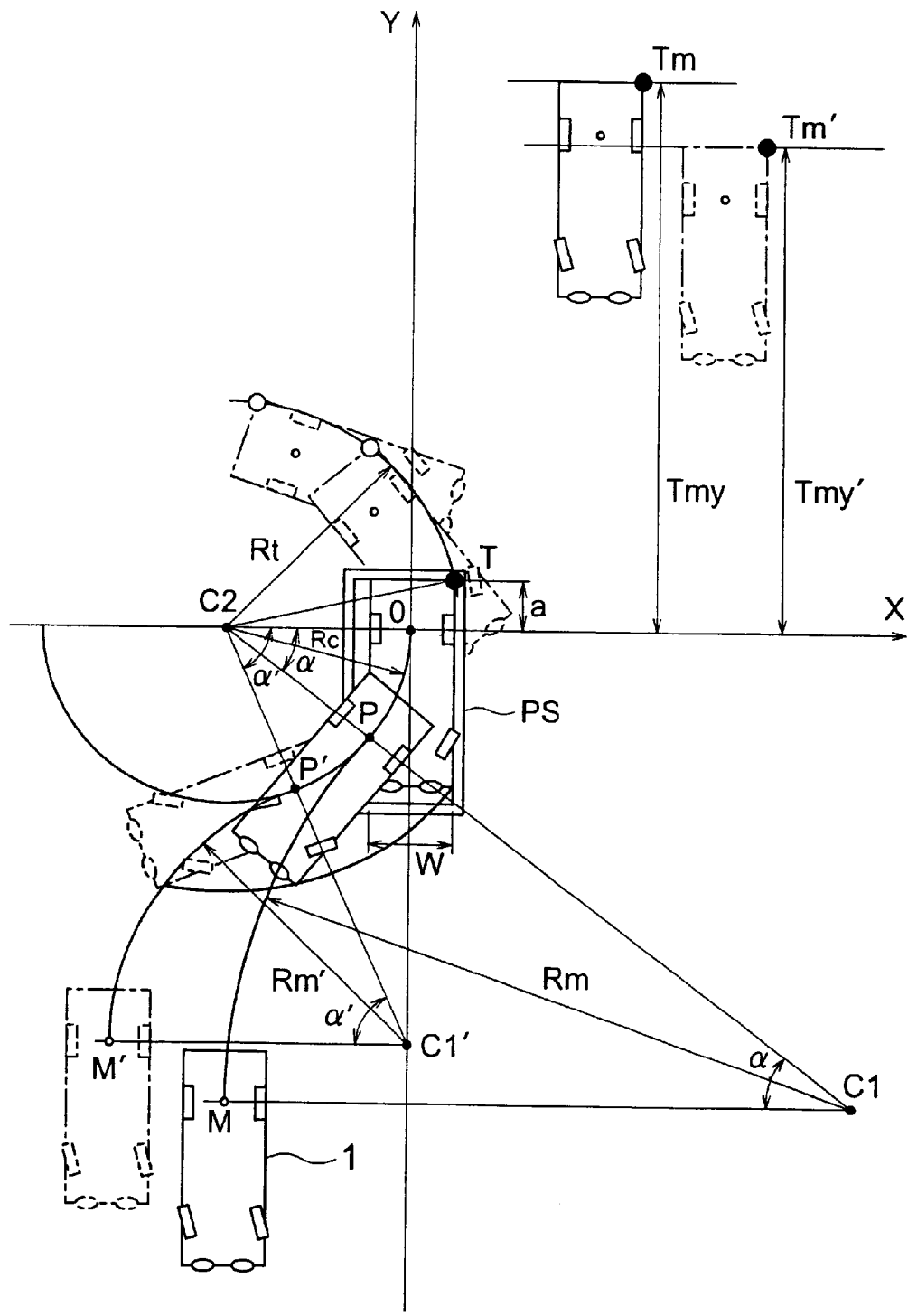
FIG. 4 is a diagram showing a display method of a guide display according to Embodiment 1.

Next, a method for drawing the parallel parking guide lines 30 and 31 and the vehicle space mark 32 will be described with reference to FIG. 4. As shown in FIG. 4, when the center of a rear accelerator of the vehicle 1 is assumed to be the origin in the state that the vehicle is appropriately parked at the parking space PS, the Y-axis is taken in a direction of backward movement of the vehicle 1 and in parallel with a road. The X-axis is taken in a direction perpendicular to the Y-axis. Also, it is assumed that the widthwise corner of the parking space PS is a target point T, and its coordinates are T (W/2, a), where W indicates a vehicle width and a indicates a rear overhang. The vehicle 1 at a vehicle position M moves backward while being turned at an angle α with a radius of Rm with a point C1 as a center (first turn), and when the vehicle reaches a vehicle position P, the steering wheel 7 is turned in a reverse direction so that the steering angle becomes maximum. In this state, the vehicle 1 is moved backward with a radius of Rc with a point C2 as a center (second turn), to thereby appropriately park the vehicle at the parking space PS.

On the screen 19, the parallel parking guide lines 30 and 31 are moved up or down by operating the seesaw switch 12, to thereby be superimposed on the rear end line of the parking space. Thus, the Y coordinate Tmy of a point Tm corresponding to the target point T of the parking space PS is obtained in the case where it is assumed that the vehicle 1 at the vehicle position M is moved in parallel to the origin, that is, the parking space PS.

The Y coordinate My of the center of the rear accelerator of the vehicle 1 at the vehicle position M is represented as follows based on the Ymy.

$My=Tmy-a$

Assuming that K1, K2 and K3 are known coefficients, the radius Rm of the first turn from the vehicle position M to the vehicle position P is obtained as follows through the steering angle θ of the steering wheel 7 at this time.

$Rm=B/\tan(K1·θ^2+K2·θ+K3)$ [B: known coefficient]

Further, the angle α is obtained from the following relation.

$\sin α=My/(Rc+Rm)$

Next, the X coordinate Tmx of the point Tm is obtained from the following relation.

$Tmx=(Rc+Rm)·(1-\cos α)+W/2$

The vehicle space mark 32 can be drawn at the position corresponding to the steering angle θ with the point Tm (Tmx, Tmy) as the rear end.

On the screen 19, the steering angle θ is changed by operating the steering wheel 7, as a result of which the vehicle space mark 32 is moved along the parallel parking guide lines 30 and 31 and then superimposed on the parking space PS. Thus, an appropriate steering angle θ corresponding to the vehicle position M can be obtained.

Next, a method for drawing the eye mark 23 will be described. The eye mark 23 can be regarded as the outer configuration of the vehicle 1 in the state that the vehicle 1 is appropriately parked at the parking space PS, which is viewed from the vehicle position P that is the return position of the steering wheel 7. Therefore, the vehicle 1 being appropriately parked at the parking space PS is turned by the angle α with the center C2 of the second turn as a center and drawn as the eye mark 23.

In general, in the case where a point P (Xp, Yp) is turned by an angle α with a point C (Xc, Yc) as a center, a point P' (Xp', Yp') is represented as follows:

$Xp'=(Xp-Xc)·\cos γ+(Yp-Yc)·\sin γ+Xc$ $Yp'=(Xp-Xc)·\sin γ+(Yp-Yc)·\cos γ+Yc$

Therefore, the eye mark 23 shown in FIG. 3D can be drawn by using the coordinates C2 (−Rc, 0) of the center C2 and the angle α.

Figure 5:
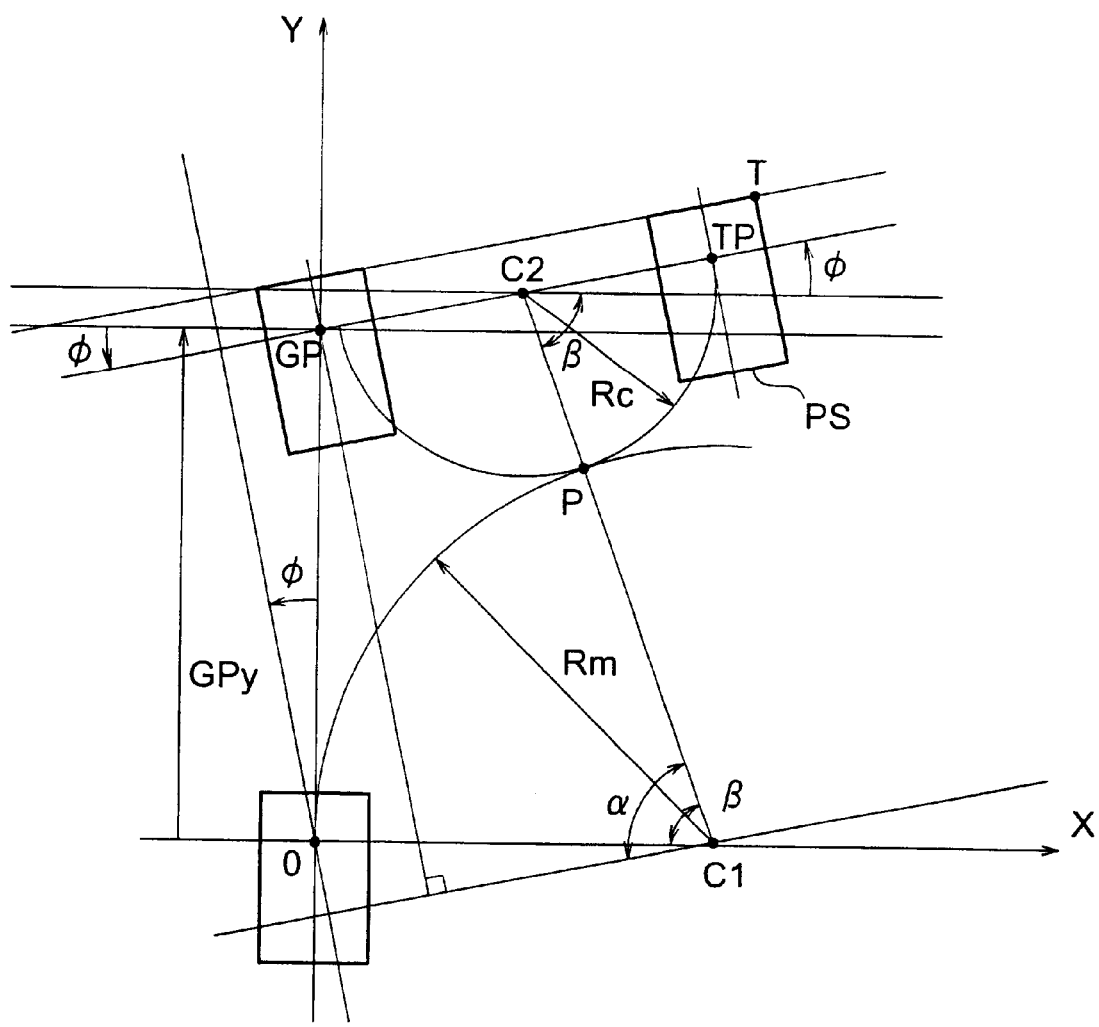
FIG. 5 is a diagram showing a display method of the inclined guide display.

Also, the parallel parking guide lines 30 and 31 and the vehicle space mark 32 are configured to be inclined on the screen 19 so that the parallel parking can be easily performed even when the stop position of the vehicle 1 is inclined with respect to the parking space PS to be a target. That is, as shown in FIG. 5, assuming the center of the rear accelerator of the vehicle 1 stopped inclined with respect to the parking space PS as the origin O, the Y-axis is taken just behind the vehicle 1 at that time and the X-axis is taken in a direction perpendicular to the Y-axis. When obtaining the turn angle φ of the vehicle 1, based thereon, the vehicle space mark 32 is inclined in a direction of the inclination φ and the relative coordinates with respect to the rear accelerator center GP is given to the point indicating the outer configuration of the vehicle space mark 32.

Assuming that the steering angle of the first turn from the origin O to the vehicle position P is β, and in the case where it is assumed that the vehicle 1 is moved to the position in parallel with the parking space PS while keeping the turn radius Rm of the first turn, the steering angle of the first turn is α, the following relations are obtained.

$\sin α=(GPy·\cos|φ|+Rm·\sin|φ|)/(Rc+Rm)$ $β=α-φ$

Therefore, the coordinates TP (TPx, TPy) of the rear accelerator center TP in the parking space PS in accordance with the steering amount of the steering wheel 7 are represented as follows:

$$TPx = Rm - (Rc + Rm) \cdot \cos \beta + Rc \cdot \cos |\phi|$$

$$Tpy = (Rc + Rm) - \sin \beta + Rc \cdot \sin |\phi|$$

The point indicating the outer configuration of the vehicle space mark 32 is drawn relative to the point TP.

Also, the eye mark 23 is drawn at the position in which the vehicle 1 is rotated by the angle β in the direction of the origin O with the center C1 of the first turn as a center in the state that the vehicle 1 is appropriately parked at the parking space PS.

Figure 6:
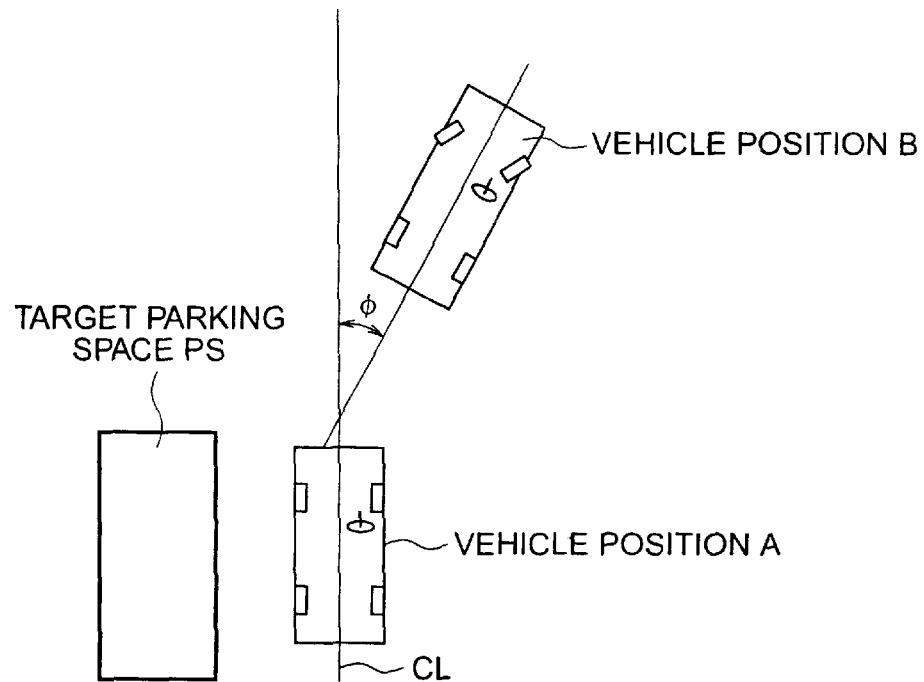
FIG. 6 is a diagram for explaining parallel parking in the case of a turn angle θ.

Next, an operation of the vehicle backward movement assisting apparatus during parallel parking will be described. First, as shown in FIG. 6, a vehicle moves straight ahead along a line CL in parallel with the target parking space PS and reaches a vehicle position A. During the above operation, the yaw rate sensor 118 keeps detecting the angle speed of the vehicle until the vehicle reaches a vehicle position B. Until the vehicle reaches the vehicle position A while advancing along the line CL, the vehicle moves straight ahead. Therefore, the right wheel and the left wheel of the vehicle rotate at the same rotation speed, and there is not nearly a difference of the rotation speed detected by the detecting means of a rotation speed difference between a right wheel and a left wheel 120, whereby it is recognized that the vehicle moves straight ahead. Then, while the vehicle moves straight ahead, the angle speed in a yaw direction of the vehicle detected by the yaw rate sensor 118 is kept being canceled.

Then, a driver gives an appropriate steering angle around where the vehicle passes the vehicle position A on the side of the target parking space PS, and the vehicle is moved to the vehicle position B inclining by the turn angle φ from the line CL in parallel with the target parking space PS, to thereby be stopped. When the vehicle starts to be turned towards the position B, the detecting means of a rotation speed difference between a right wheel and a left wheel 120 detects the difference of the rotation speed between the right wheel and the left wheel. The above difference of the rotation speed becomes the predetermined value or more, whereby it is recognized that the vehicle starts to be turned. The steering angle speed of the vehicle, which is detected by the yaw rate sensor from the turn start, is added as a yaw angle.

When the driver operates the shift lever 5 so as to be set to the backward movement position at the vehicle position B, the yaw angle at this time is detected as the turn angle φ from the vehicle position A at the time of starting turn with the yaw angle in the base state. That is, the operation for manipulating the shift lever 5 so as to be set to the backward movement position is the operation for indicating the timing for determining the turn angle φ. Also, based on the detection signal from the rear position switch 10, as shown in FIG. 3A, the image processor 8 displays the pair of parallel parking guide lines 30 and 31 disposed symmetric to the right and left and the vehicle space mark 32 disposed therebetween on the screen 19 of the monitor 4 so as to be superimposed on the image picked by the camera 2. At this time, the image processor 8 displays the parallel parking guidelines 30 and 31 and the vehicle space mark 32 to be inclined on the screen 19 based on the turn angle φ.

While viewing the display of the screen 19 of the monitor 4, the driver operates the seesaw switch 12 to move the parallel parking guidelines 30 and 31 and the vehicle space mark 32 up and down. As shown in FIG. 3B, when the parallel parking guide line 30 is superimposed on the rear end line U of the parking space PS, the operation of the seesaw switch 12 is completed.

Here, when the steering wheel 7 is returned to the left, the vehicle space mark 32 gradually moves leftward along the parallel parking guide line 30 in accordance with the steering amount of the steering wheel 7. Then, as shown in FIG. 3C, when the vehicle space mark 32 is superimposed on the parking space PS, the vehicle 1 is moved backward while the steering angle θ of the steering wheel 7 is retained. Thus, the vehicle 1 is turned with a radius of Rm. At that time, the driver can move the vehicle 1 backward while ensuring the safety of the periphery of the vehicle with his eyes being averted from the screen 19.

When the first turn starts, the CPU 13 completes the display of the parallel parking guide lines 30 and 31 and the vehicle space mark 32, and instead displays the eye mark 23 so as to be superimposed on the image picked up by the camera 2. With the backward movement of the vehicle 1, the parking space PS gradually approaches the eye mark 23 on the screen 19. Then, as shown in FIG. 3D, when the parking space PS is superimposed on the eye mark 23, it is judged that the vehicle 1 reaches the vehicle position P, and the vehicle 1 is stopped.

Next, the steering angle of the steering wheel 7 is made maximum in the reverse direction during a static turn, and in this state, the vehicle 1 is moved backward. At this time, the driver can move the vehicle 1 backward while ensuring the safety of the periphery of the vehicle 1 with his eyes being averted from the screen 19. As a result, the vehicle 1 appropriately enters the parking space PS. When the driver recognizes a gap between the vehicle and the rear, or when the side portion of the vehicle 1 becomes in parallel with a road side, the vehicle 1 is stopped and the lateral parking is completed.

The general custom is such that a vehicle is stopped inclinedly with respect to the target parking space to start the parking operation. However, in Embodiment 1, even in the state where the vehicle 1 is stopped at the position inclined with respect to the target parking space PS, the parallel parking guide lines 30 and 31 are superimposed on the rear end line U of the parking space PS on the screen 19 by only the operation of the seesaw switch 12. Further the steering wheel 7 is steered to superimpose the vehicle space mark 32 on the parking space PS, whereby the parallel parking at the parking space PS can be easily performed.

Note that, the parking at the parking space which is located in a backward direction to the left is described above, but, in a similar manner, the parallel parking at the parking space which is located in a backward direction to the right can also be performed. Also, the parallel parking guide lines are moved by the seesaw switch 12, but, the present invention is not limited to this. For example, the movement display may be conducted with the touch panel equipped on the screen of the monitor 4.

Embodiment 2

Figure 22:
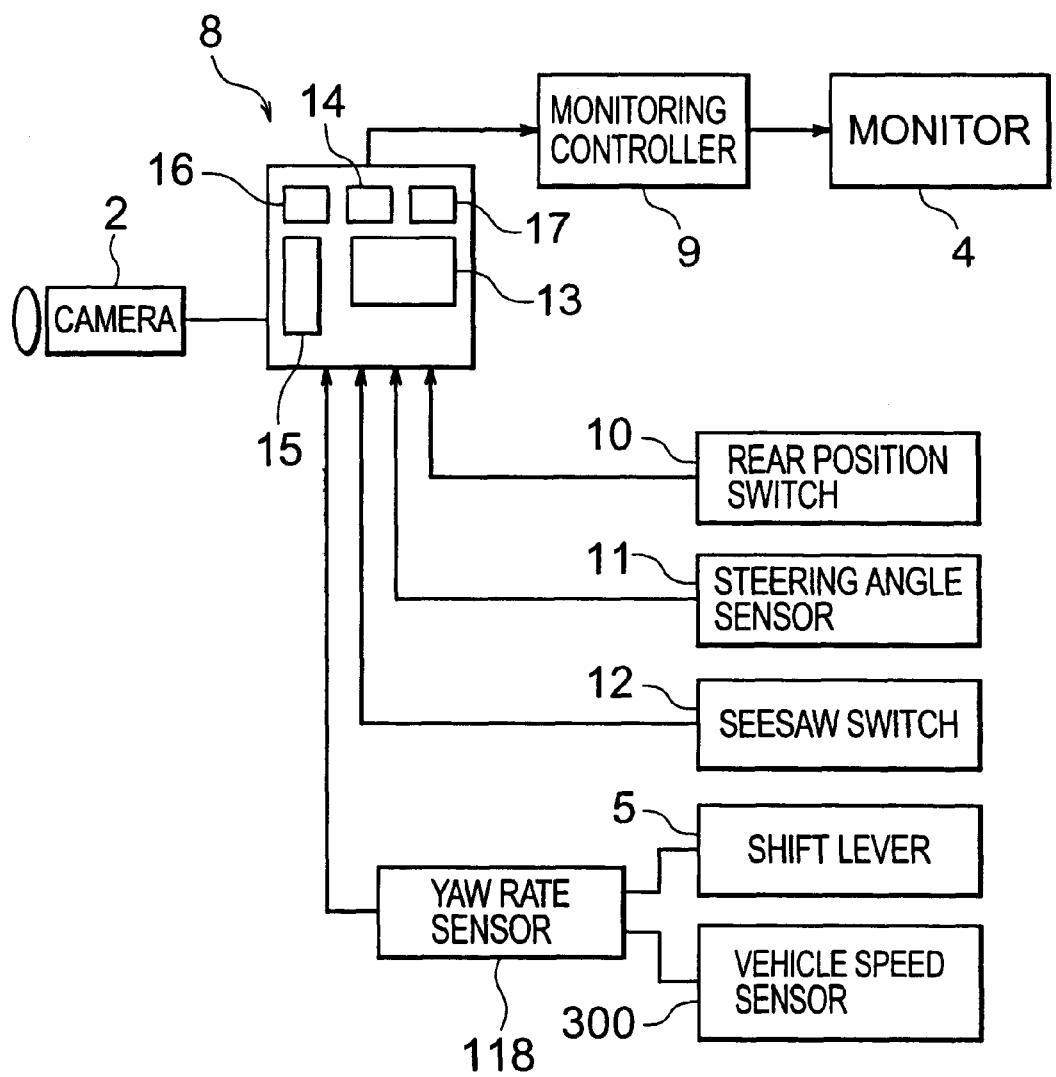
FIG. 22 is a block diagram showing a structure of a vehicle backward movement assisting apparatus according to Embodiment 2, in which means for recognizing a start of turn is composed of a vehicle speed sensor and a steering angle sensor.
Figure 23:
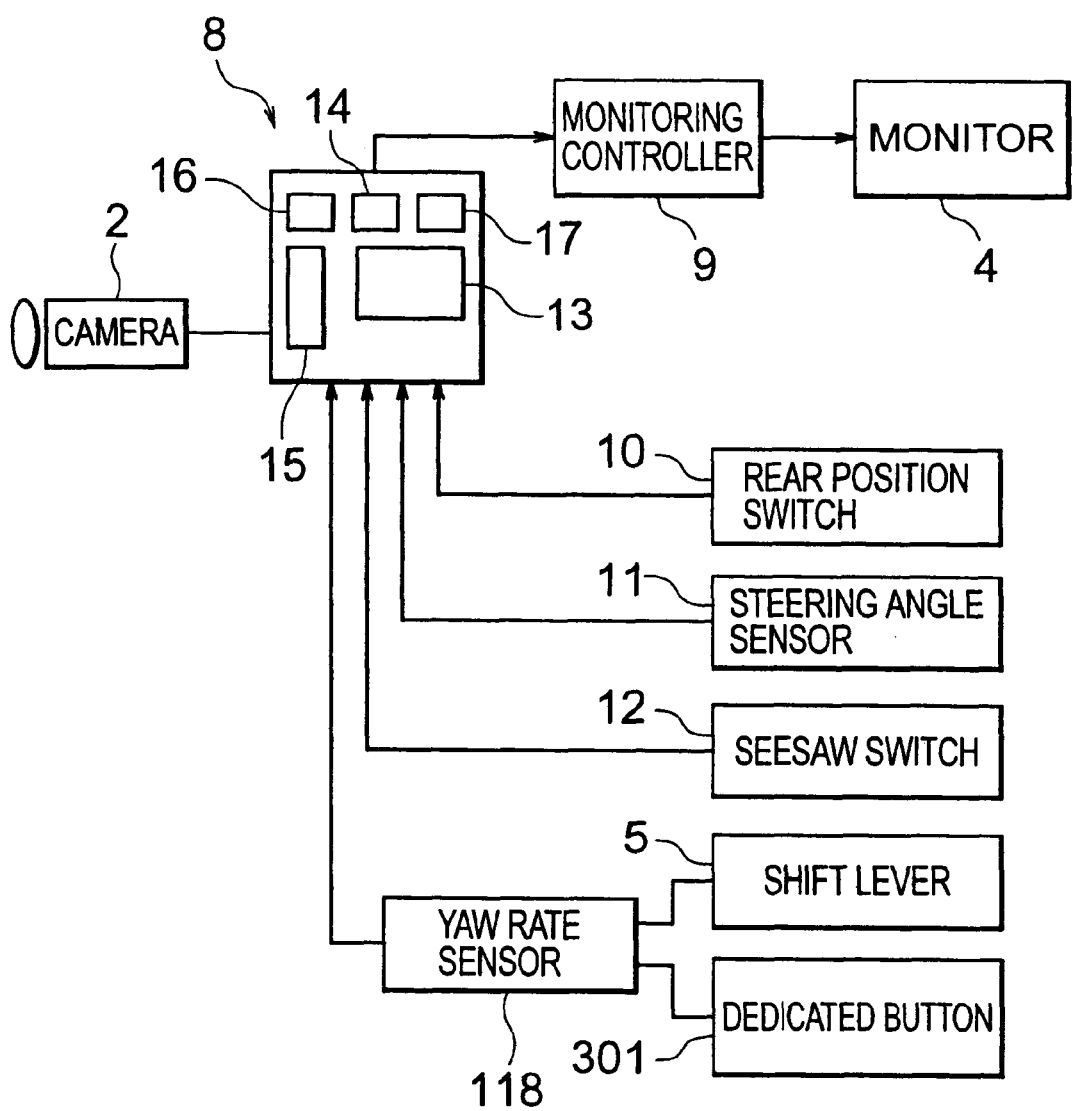
FIG. 23 is a block diagram showing the structure of the vehicle backward movement assisting apparatus according to Embodiment 2, in which means for recognizing a start of turn comprises a dedicated button.

In Embodiment 1, the detecting means of a rotation speed difference between a right wheel and a left wheel 120 is employed as means for recognizing the start of the turn of the vehicle. However, the present invention is not limited to this. For example, as shown in FIG. 22, the recognizing means may be comprised of a vehicle speed sensor 300 and the steering angle sensor 11. In this case, when the vehicle speed sensor detects a vehicle speed faster than a constant value and the steering angle sensor detects a steering angle larger than a predetermined angle so as to turn the vehicle, it can be recognized that the vehicle turn is started out of the state of the vehicle being moved straight. Also, as another modified embodiment, as shown in FIG. 23, instead of the detecting means of the rotation speed difference between a right wheel and a left wheel 120, a dedicated button 301 may also be employed. That is, the driver presses the dedicated button at the vehicle position A in FIG. 6, whereby it may be recognized that the vehicle turn is started.

Embodiment 3

Figure 24:
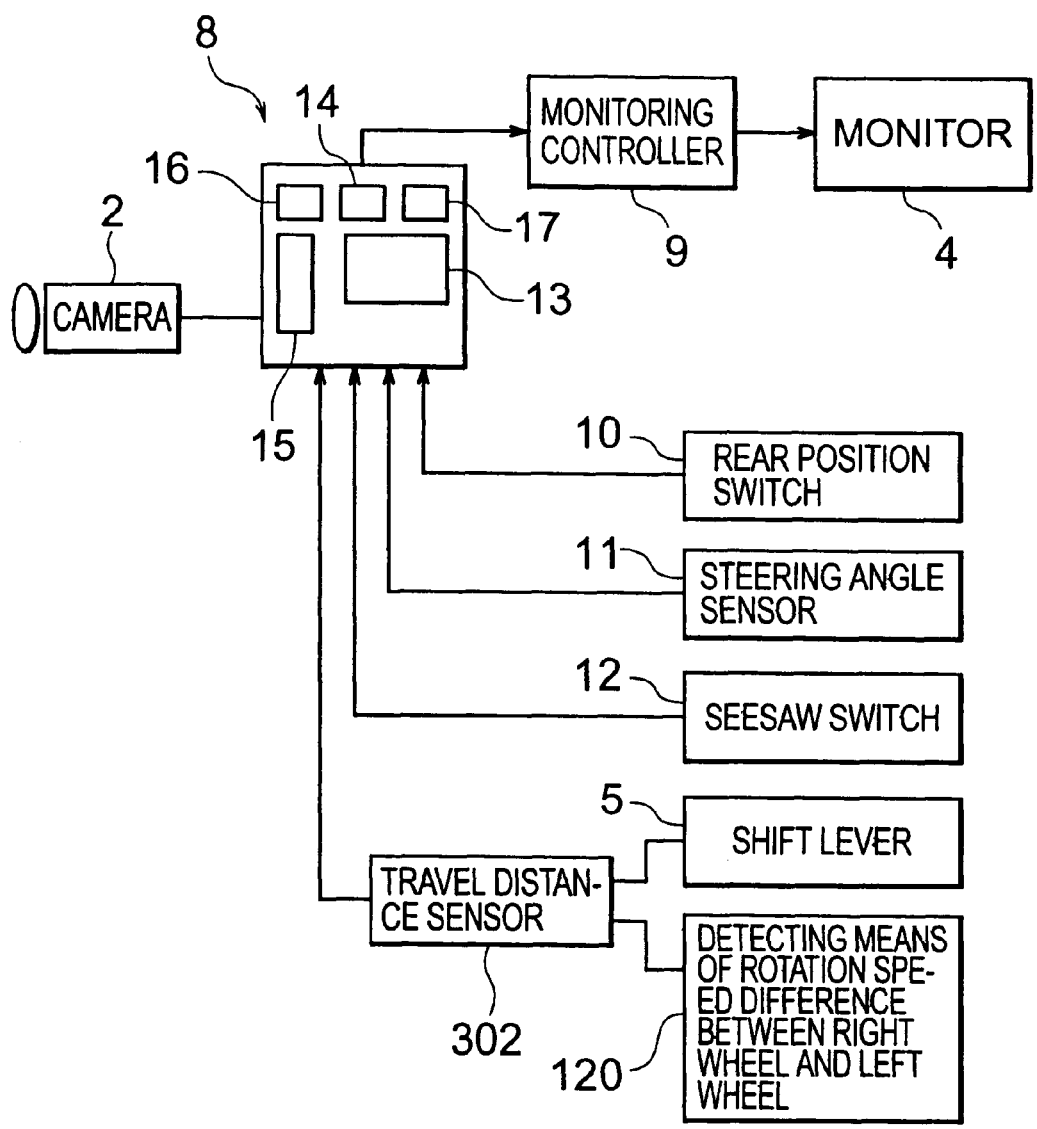
FIG. 24 is block diagram showing a structure of a vehicle backward movement assisting apparatus according to Embodiment 3, in which means for detecting a turn angle is composed of a steering angle sensor and a travel distance sensor.
Figure 25:
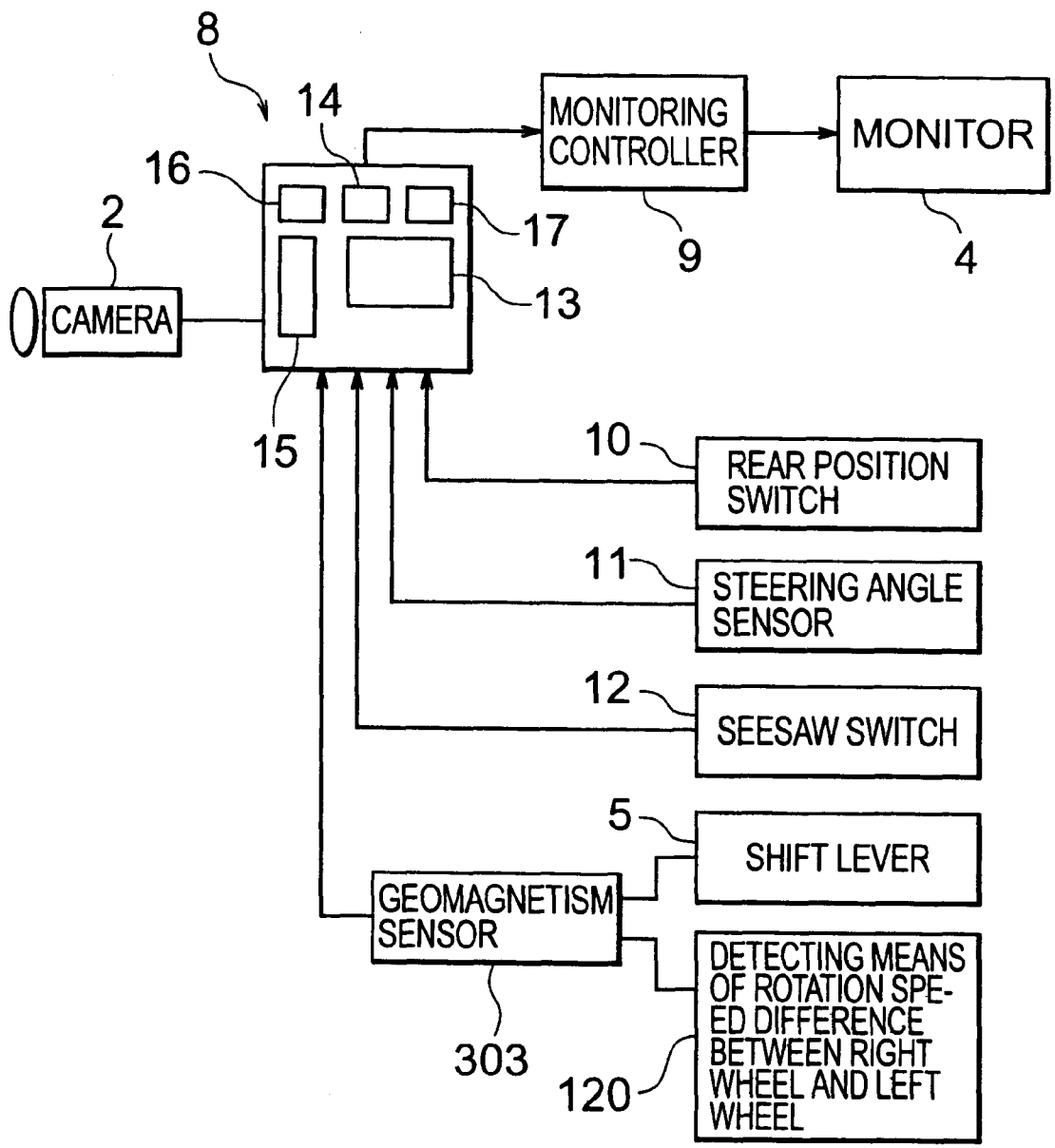
FIG. 25 is a block diagram showing the structure of the vehicle backward movement assisting apparatus according to Embodiment 3, in which the means for detecting a turn angle comprises a geomagnetism sensor.

In Embodiment 1, the yaw rate sensor 118 is employed as the turn angle detecting means for detecting the turn angle of the vehicle from the turn start. However, the present invention is not limited to this. For example, as shown in FIG. 24, the detecting means may be composed of the steering angle sensor 11 and a travel distance sensor 302. That is, the turn radius of the vehicle is obtained based on the steering angle detected by the steering angle sensor 11 and the travel distance is obtained by the travel distance sensor. Thus, the turn angle of the vehicle can be detected based on the information of the travel amount with the obtained turn radius. Also, as another modified embodiment, as shown in FIG. 25, instead of the yaw rate sensor 118, a geomagnetism sensor 303 can also be employed.

Embodiment 4

Figure 26:
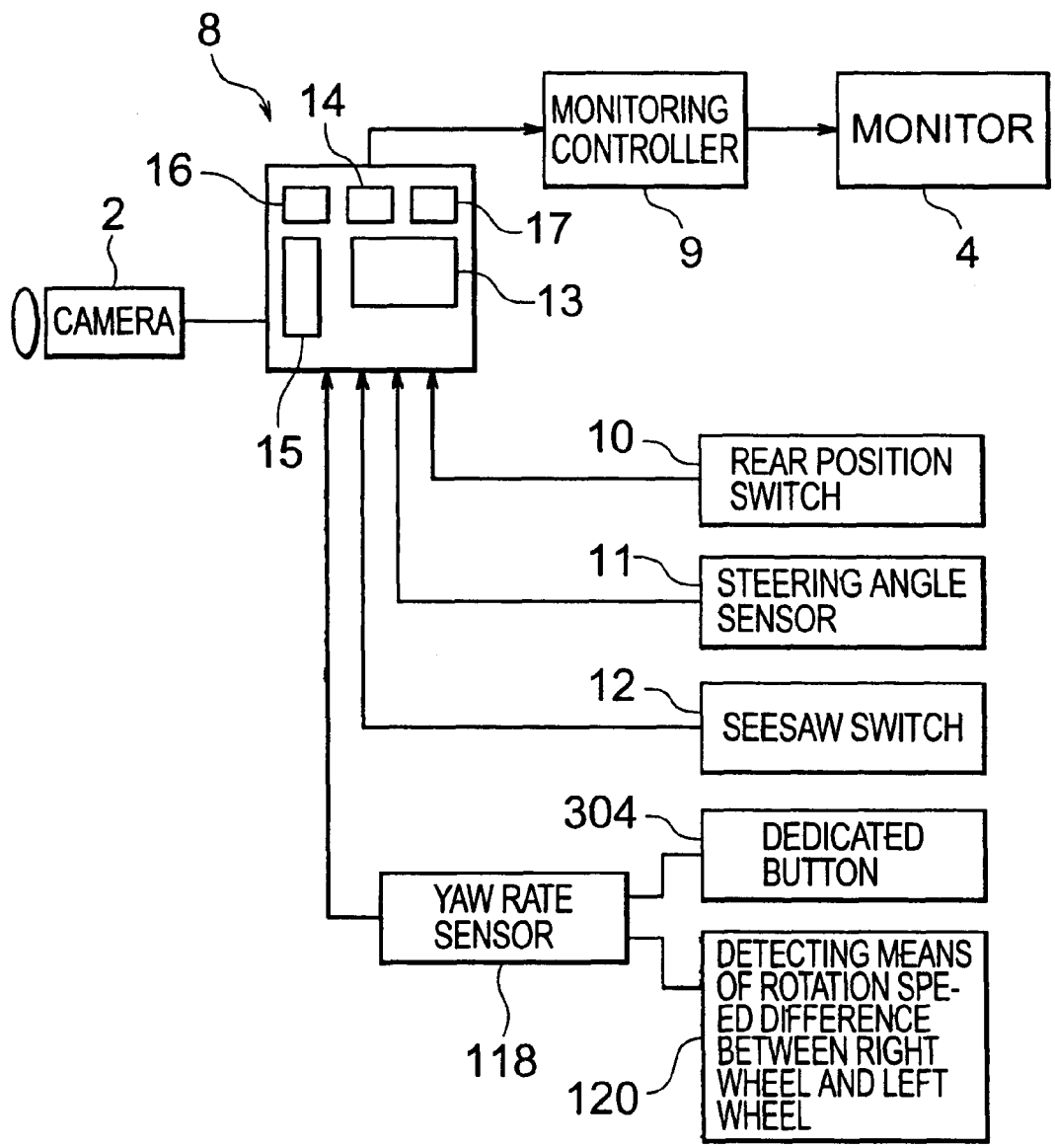
FIG. 26 is a block diagram showing a structure of a vehicle backward movement assisting apparatus according to Embodiment 4, in which means for indicating an acquisition of a turn angle comprises a dedicated button.

In Embodiment 1, the shift lever 5 is employed as the indicator of a turn angle acquisition for indicating the timing for detecting the turn angle. However, the present invention is not limited to this. For example, as shown in FIG. 26, a dedicated button 304 may also be employed.

Embodiment 5

Figure 7:
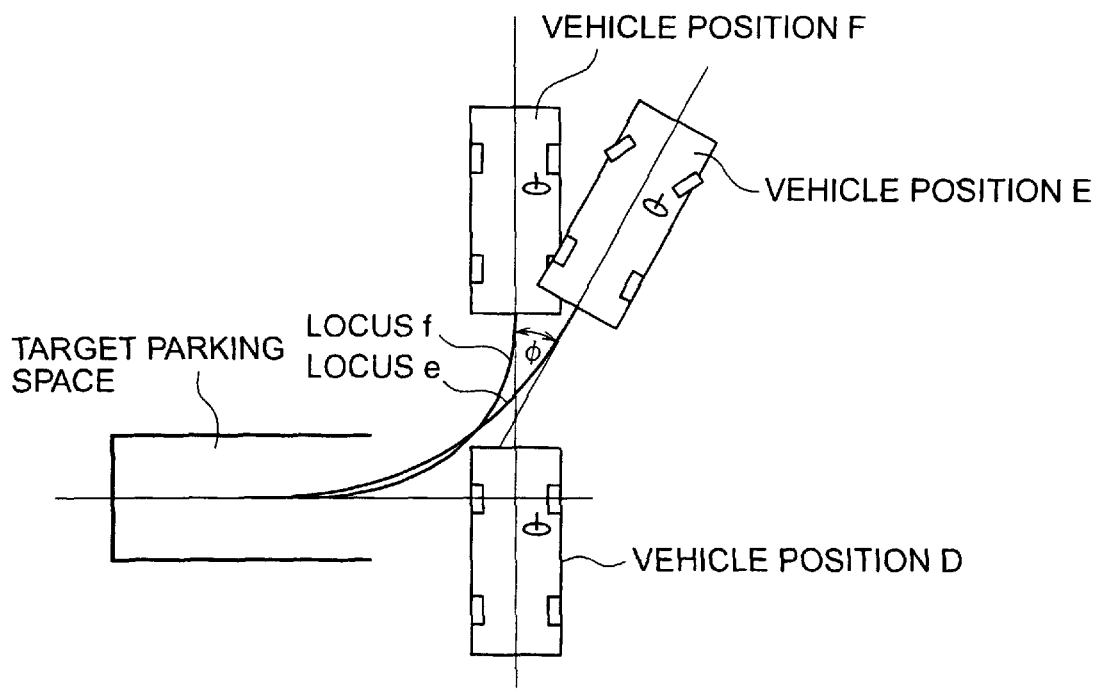
FIG. 7 is a diagram for explaining lateral parking in the case of a turn angle θ.

In Embodiments 1 to 4, the case where the present invention is applied to parallel parking is described as an example. However, the present invention can also be applied to lateral parking. That is, according to the present invention, the turn angle of the vehicle can be detected with a vehicle position D as a standard in FIG. 7. Therefore, in a vehicle position F where the turn angle is 0°, the vehicle is finally turned at a 90° angle therefrom before advancing into the target parking space. Thus, a steering assistance locus f by 90° can be drawn, and a steering assistance locus e by 90–φ° can be drawn at a vehicle position E of the turn angle φ. Therefore, when a constant locus, for example, by 90°, is drawn regardless of the turn angle of the vehicle position where the backward movement is started, as the vehicle approaches to the target parking space, the top end portion of the locus is displayed so as to be off the target parking space, whereby there is a fear that an appropriate steering becomes difficult to be performed. However, when the length of the locus is adjusted in accordance with the detectable turn angle according to the present invention, the driver steers so that the top end of the locus is contained in the target parking space, thereby the driver can conduct the appropriate lateral parking and easily grasp the backward movement amount.

Embodiment 6

Figure 8:
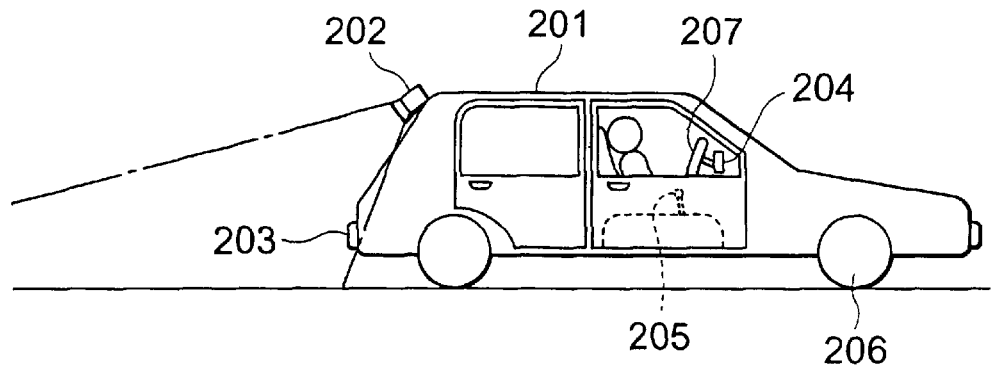
FIG. 8 is a side view showing the vehicle equipped with the vehicle backward movement assisting apparatus during parallel parking operation according to the present invention.

As shown in FIG. 8, a camera 202 for picking up the rear view of a vehicle 201 is installed at the rear portion of the vehicle 201. A rear portion bumper 203 of the vehicle 201 is disposed at a side end portion close to the view range of the camera 202. A monitor 204 composed of a color type liquid crystal display is disposed at the driver's seat of the vehicle 201. The monitor 204 is usually used as a display apparatus of a navigation apparatus. The monitor 204 is structured such that the image picked up by the camera 202 is displayed thereon when a shift lever 205 provided at the driver's seat is operated to a backward movement position. Front wheels 206 as steered wheels are steered by operating a steering wheel 207.

Figure 9:
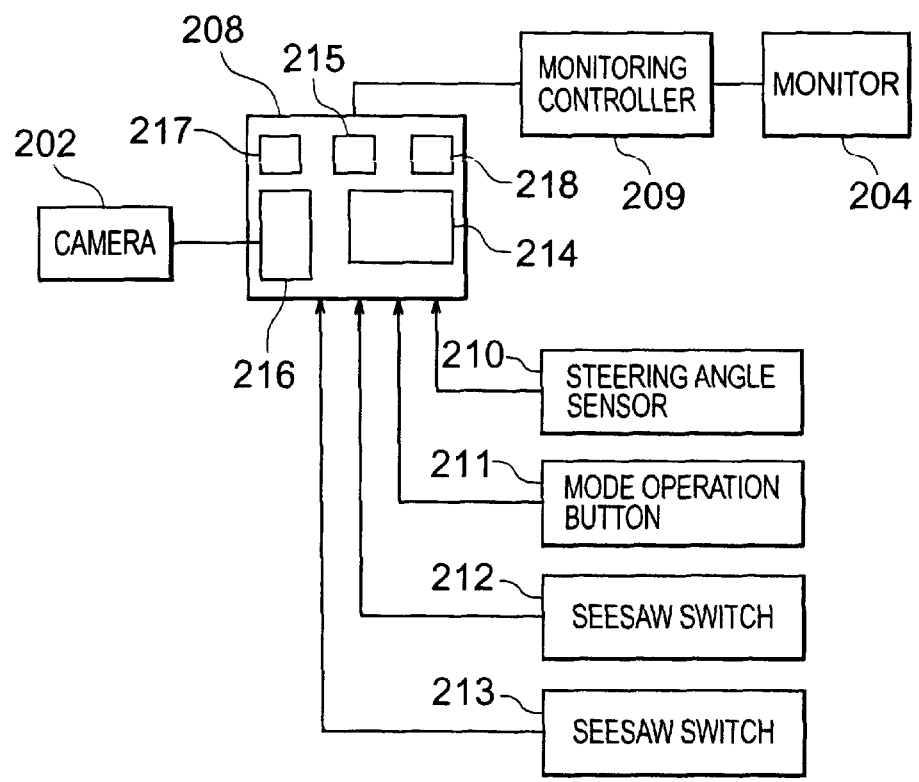
FIG. 9 is a block diagram showing a structure of a vehicle backward movement assisting apparatus according to Embodiment 6.

FIG. 9 shows the structure of the vehicle backward movement assisting apparatus during parallel parking operation according to Embodiment 6 of the present invention. The camera 202 is connected to an image processor 208. The image processor 208 is connected to the monitor 204 via a monitoring controller 209. A steering angle sensor 210 for detecting the steering angle θ of the steering wheel 207 is installed to the steering shaft of the steering wheel 207 of the vehicle 201. Also, at the driver's seat, a mode operation button 211 for performing operations by selecting various kinds of modes, a seesaw switch 212 to be a first switch and a seesaw switch 213 to be a second switch, by which a moving guide display described later is moved in parallel and rotated on the monitor 204, are disposed. Each of the steering angle sensor 210, the mode operation button 211, the seesaw switch 212 and the seesaw switch 213 is connected to the image processor 208.

The monitoring controller 209 normally inputs a display signal from a navigation apparatus (not shown) to perform the display on the monitor 204. However, when a display signal is input from the image processor 208, the display is performed on the monitor 204 based on the display signal from the image processor 208.

The image processor 208 is provided with a CPU 214, a ROM 215 storing the control program, an image processing processor 216 for processing image data picked up by the camera 202, an image memory 217 storing image data processed by the image processing processor 216, and an operation RAM 218.

The display controlling means according to the present invention is composed of the image processor 208, and the monitoring controller 209 described above.

Figure 10A:
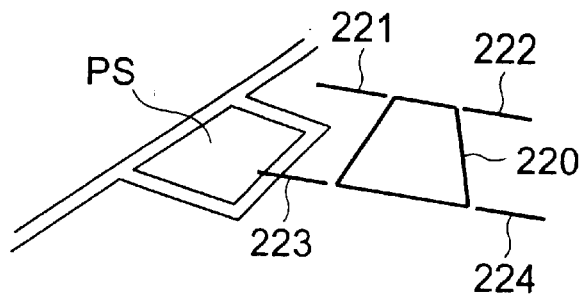
FIG. 10 is diagrams stepwise and schematically showing the monitor screen during parallel parking operation according to Embodiment 6.

The CPU 214 is operated based on the control program stored in the ROM 215. When the parallel parking mode is selected by the mode operation button 211, as shown in FIG. 10A, the CPU 214 creates the display data in a predetermined cycle, in which a rectangular vehicle space mark 220 disposed at a substantially center portion of the screen of the monitor 204, parallel parking guide lines 221 and 222 extended from the rear ends of the vehicle space mark 220 to the right and left and in parallel with the direction of the vehicle width, and parallel parking guide lines 223 and 224 extended from the front ends of the vehicle space mark 220 to the right and left and in parallel with the direction of the vehicle width, are superimposedly displayed on the image picked up by the camera 202.

Figure 10B:
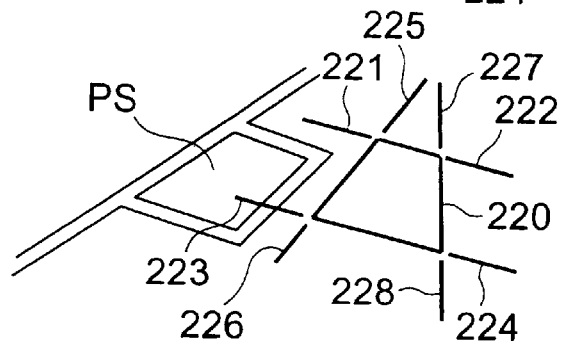

Further, when the rotating seesaw switch 213 disposed at the driver's seat is operated, as shown in FIG. 10B, on the screen of the monitor 204, the CPU 214 creates display data in a predetermined cycle, in which auxiliary lines 225 and 226 extended from the left ends of the vehicle space mark 220 in parallel with the lengthwise (longitudinal) direction of the vehicle, and auxiliary lines 227 and 228 extended from the right ends of the vehicle space mark 220 in parallel with the lengthwise direction of the vehicle are superimposedly displayed on the image picked up by the camera 202.

When the seesaw switch 212 disposed at the driver's seat is operated, the vehicle space mark 220, the parallel parking guide lines 221 to 224 and the auxiliary lines 225 to 228 are moved together in an up-and-down direction within the screen. Further, by operating the seesaw switch 213, the vehicle space mark 220, theses become flexibly rotatable.

Further, the CPU 214 causes all of the vehicle space mark 220, the parallel parking guide lines 221 to 224 and the auxiliary lines 225 to 228 to move, upon display thereof along the parallel parking guide lines 221 and 223 or the parallel parking guide lines 222 and 224, which is performed in accordance with the steering angle θ of the steering wheel 207 at that time, based on the output signal of the steering angle sensor 201. For example, when the steering wheel 207 is turned to the left, as shown in FIG. 10D, the vehicle space mark 220, the parallel parking guide lines 221 to 224 and the auxiliary lines 225 to 228 are moved in a left direction along the parallel parking guide lines 221 and 223 indicated in the left side of the screen.

Also, when a driver selects a learning function mode for parallel parking, the CPU 214 stores in a memory (not shown) the inclination angle of the moving guide display which is rotated by the operation of the seesaw switch 213 in a series of parallel parking sequences is conducted. When the parallel parking mode is selected by the mode operation button 211, the moving guide display is performed based on the past average inclination angle.

Figure 12:
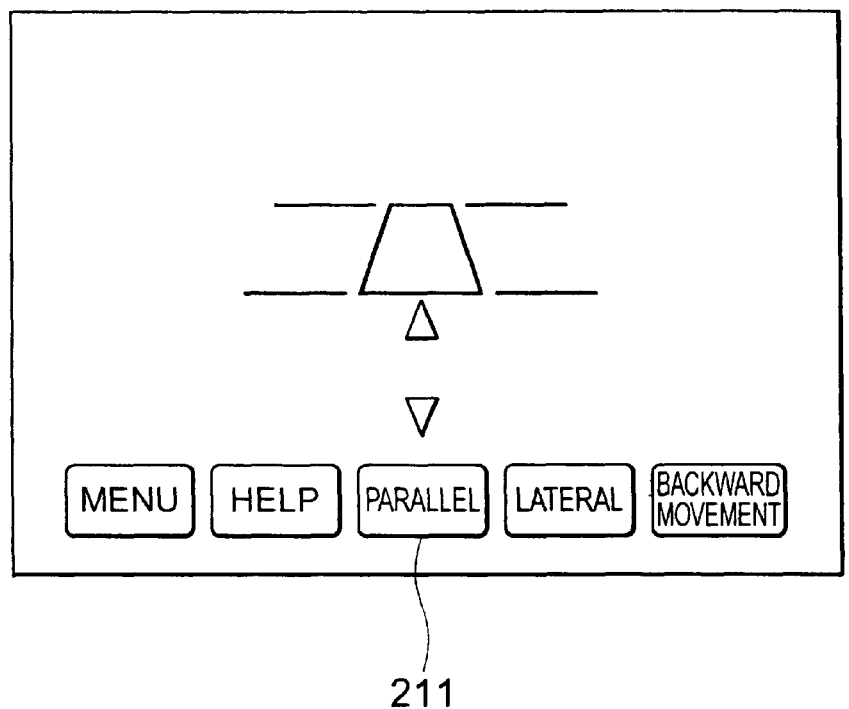
FIG. 12 is a diagram showing a mode operation button according to Embodiment 6.
Figure 13:
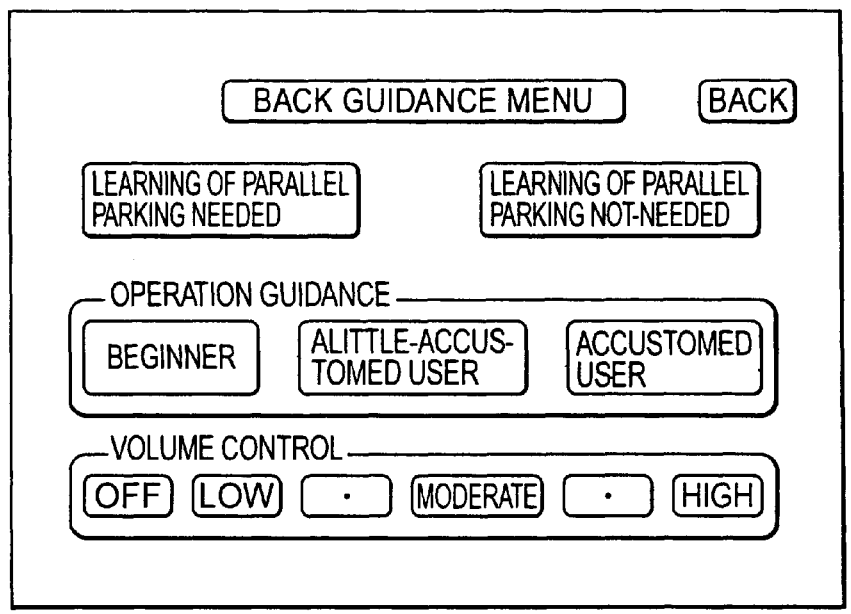
FIG. 13 is a diagram showing a back guidance menu screen according to Embodiment 6.

Next, the operation of the vehicle backward movement assisting apparatus during parallel parking operation will be described with reference to the flowchart of FIG. 11. First, the vehicle 201 is stopped at a position inclined with respect to the parking space PS, and when the parallel parking mode is selected by the mode operation button 211 on the screen of the monitor 204 shown in FIG. 12, a back guidance menu shown in FIG. 13 appears. Here, "learning of parallel parking needed" is selected at step S1.

At step S2, the CPU 214 reads out the average inclination angle of the past stored in a memory (not shown). At step S3, the CPU 214 displays the vehicle space mark 220 and the parallel parking guide lines 221 to 214 on the screen of the monitor 204 in accordance with the inclination angle which is read out, so as to be superimposed on the image picked up by the camera 202, as shown in FIG. 10A.

The vehicle space mark 220 and the parallel parking guide lines 221 to 224 are displayed in a inclined state based on the past accumulated results. Thus, the vehicle space mark 220 and the parallel parking guide lines 221 to 224 may match with the inclination of the parking space PS at this point. However, when a driver judges that the vehicle space mark 220 and the parallel parking guide lines 221 to 224 still do not match with the inclination of the parking space PS, the seesaw switch 213 is operated so as to make the vehicle space mark 220 and the parallel parking guide lines 221 to 224 match with the inclination of the parking space PS. When the seesaw switch 213 is operated, the CPU 214 additionally displays the auxiliary lines 225 to 228 extended from the vehicle space mark 220 in a lengthwise direction of the vehicle as shown in FIG. 10B. Then, the vehicle space mark 220, the parallel parking guide lines 221 to 224 and the auxiliary lines 225 to 228 are rotated and displayed in accordance with the operation amount of the seesaw switch 213 at step S4. The driver operates the seesaw switch 213 so that the right line and the left line of the vehicle space mark 220 and the auxiliary lines 225 to 228 become in parallel with the side lines of the parking space PS.

Figure 10C:
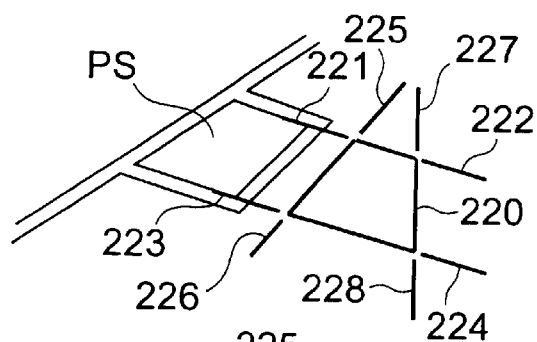
Figure 10D:
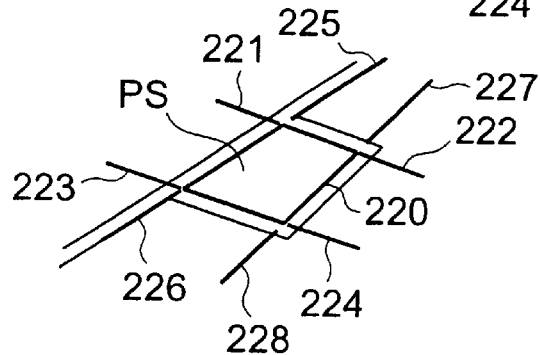

Next, the driver operates the seesaw switch 212 so that the parallel parking guide lines 221 to 224 are superimposed on the rear end line and the front end line of the parking space PS as shown in FIG. 10C.

Figure 10E:
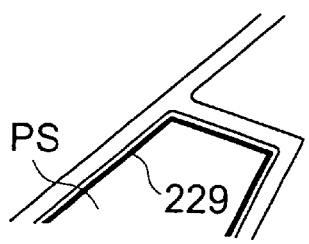

Here, as shown in FIG. 10D, the driver operates the steering wheel 207 so that the vehicle space mark 220 is superimposed on the parking space PS, and thereafter the vehicle 201 is moved backwards while retaining the steering angle θ of the steering wheel 207. Here, the CPU 214 ends the display of the vehicle space mark 220, the parallel parking guide lines 221 to 224 and the auxiliary lines 225 to 228, and instead as shown in FIG. 10E, an eye mark 229 is fixedly displayed so as to be superimposed on the image picked up by the camera 202. At the position where the parking space PS is superimposed on the eye mark 229, the driver judges that the vehicle reaches the vehicle position P and stops the vehicle. Further, the steering angle of the steering wheel 207 is made maximum in the reverse direction during a static turn, and in this state, the vehicle 1 is moved backward, to thereby complete parallel parking.

In the above manner, a series of the sequences of parallel parking is completed at step S5. Thereafter, since "learning of parallel parking needed" has been already selected at step S6, operation proceeds to step S7. The CPU 214 writes the inclination angle of the moving guide display made at the present step S4 in the memory (not shown), and calculates and then stores the average value of the inclination angles of the past. This average value of the inclination angle is used for the sequence of parallel parking of the next time.

Figure 14:
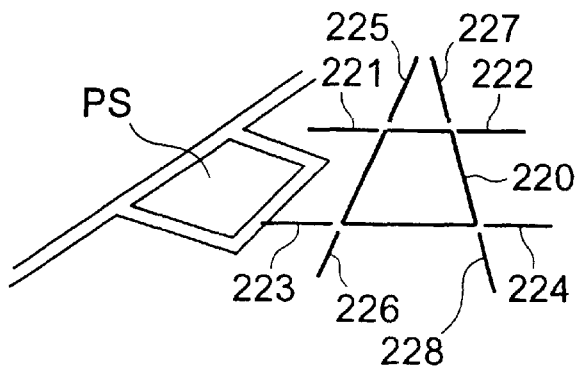
FIG. 14 is a diagram schematically showing the monitor screen in the case where a parallel parking learning function is disabled according to Embodiment 6.

Note that, when selecting "learning of parallel parking not-needed" at step S1, the average value of the inclination angles stored in the memory is initialized at step S8, that is, set to be zero, and the operation proceeds to step S3. Since the inclination angle is 0° in the state, the moving guide display is represented so as to be displayed upright with respect to the screen as shown in FIG. 14.

Further, since "learning of parallel parking not-needed" is selected, the processing is completed without performing the writing of the inclination angle and the calculation of the average value at step S7.

Embodiment 7

Figure 15:
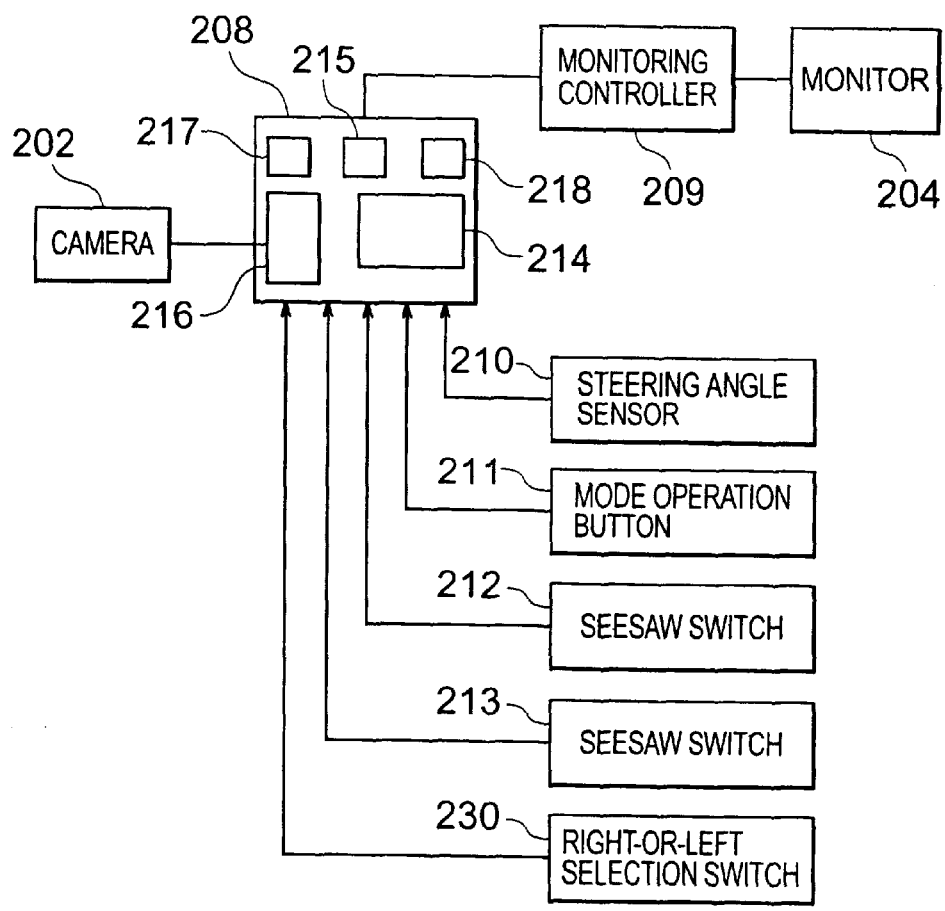
FIG. 15 is a block diagram showing a structure of the vehicle backward movement assisting apparatus according to Embodiment 7.

FIG. 15 illustrates the structure of the vehicle backward movement assisting apparatus during parallel parking operation according to Embodiment 7. The present vehicle backward movement assisting apparatus is the apparatus of Embodiment 6 shown in FIG. 9, provided with a right-or-left selection switch 230 disposed at the driver's seat. The right-or-left selection switch 230 is connected to the image processor 208. Note that, the image processor 208 is equipped with a memory used for the left parallel parking and a memory for the right parallel parking.

When selecting the parallel parking mode, a driver selects either of the right parallel parking or the left parallel parking by the right-or-left selection switch 230.

The CPU 214 stores the average value of the past inclination angles in the left parallel parking in the memory used for the left parallel parking and stores the average value of past inclination angles in the right parallel parking in the memory used for the right parallel parking, so that each of the average values is separately stored. When either of the right parallel parking or the left parallel parking is selected by the right-or-left selection switch 230, the average value of the inclination angle corresponding to the parallel parking of the selected direction is read out from the memory corresponding thereto, and the moving guide display is represented in accordance with the average value.

Embodiment 8

In Embodiment 8, the image processor 208 judges the direction of parallel parking based on the steering angle detected by the steering angle sensor 210. The structure of the vehicle backward movement assisting apparatus is similar to that of Embodiment 1 shown in FIG. 9. Note that, the image processor 208 is equipped with a memory used for the left parallel parking and a memory for the right parallel parking.

Figure 16:
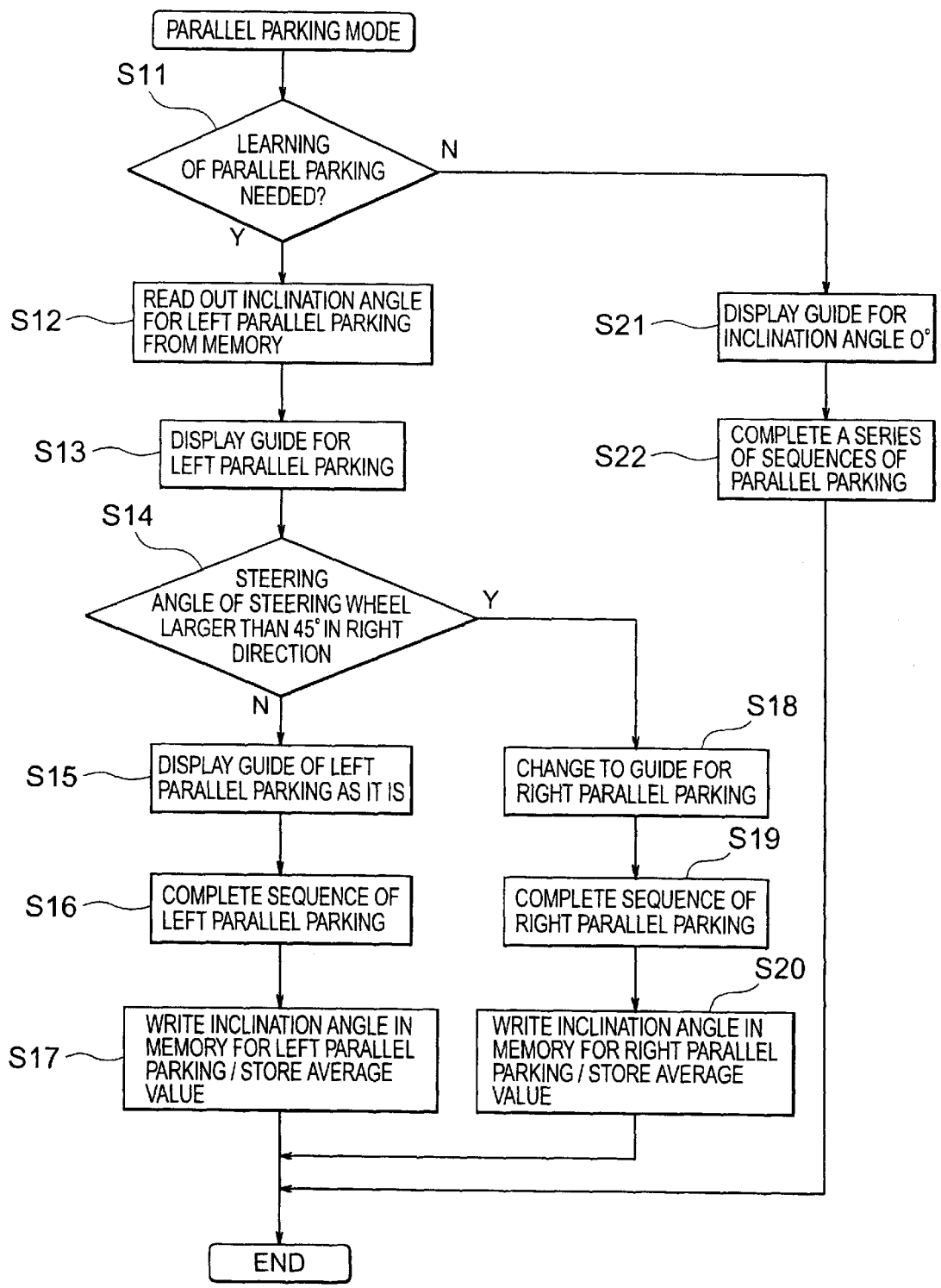
FIG. 16 is a flowchart showing operations according to Embodiment 8.

The operation of the vehicle backward movement assisting apparatus according to Embodiment 8 will be described with reference to a flowchart shown in FIG. 16.

First, the vehicle 201 is stopped at a position inclined with respect to the parking space PS. A driver selects a parallel parking mode by the mode operation button 211. Then "learning of parallel parking needed" is selected at step S11.

Figure 17A:
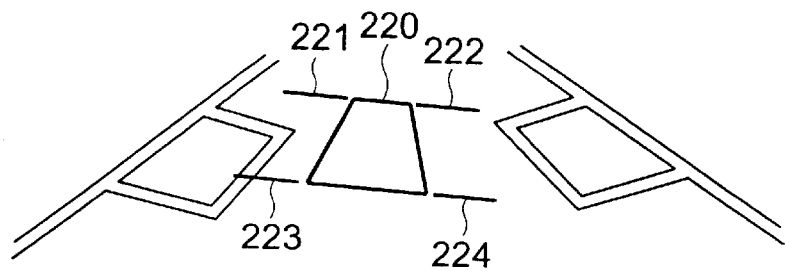
FIG. 17 is diagrams stepwise and schematically showing the monitor screen during parallel parking operation according to Embodiment 8.

At step S12, the CPU 214 reads out the average inclination angle of the left parallel parkings performed in the past, which is stored in the memory (not shown) used for the left parallel parking. At step S13, the CPU 214 displays the vehicle space mark 220 and the parallel parking guide lines 221 to 214 on the screen of the monitor 204 in accordance with the inclination angle which is thus read out, so as to be superimposed on the image picked up by the camera 202 as shown in FIG. 17A.

At the following step S14, the CPU 214 judges whether the steering angle detected by the steering angle sensor 210 is greater than 45° in a right direction. Here, when a driver tries to start the left parallel parking, the driver does not turn the steering wheel 207 but starts the operation of the seesaw switch 213. Therefore, moving from step S14 to step S15, the CPU 214 displays the moving guide display for the left parallel parking as the moving guide display. When, in a manner similar to that in Embodiment 6, a series of the sequences of the left parallel parking is completed at step S16, the CPU 214 writes the inclination angle of the moving guide display in this sequence in the memory (not shown) used for the left parallel parking, and calculates and then stores the average value of the inclination angles of the past. This average value of the inclination angle is used in the next left parallel parking.

Figure 17B:
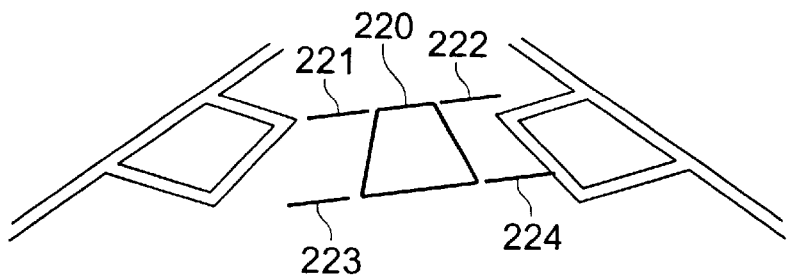
Figure 17C:
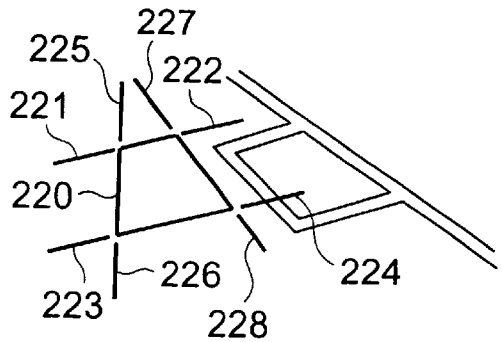

Also, when the driver tries to start the right parallel parking, after the moving guide display used for the left parallel parking is represented at step S13, the driver starts to return the steering wheel 207 to a right direction with the intention of performing the right parallel parking. Then, when the steering angle of the steering wheel 207 becomes greater than 45° to a right direction, the CPU 214 judges the direction of parallel parking as the right one. At step S18, the past average inclination angle of the right parallel parking, which is stored in the memory (not shown) used for the right parallel parking, is read out. Then, the CPU 214 displays the vehicle space mark 220 for the right parallel parking and the parallel parking guide lines 221 to 214 on the screen of the monitor 204 in accordance with the inclination angle, which is thus read out, so as to be superimposed on the image picked up by the camera 202, as shown in FIG. 17B.

Thereafter, the operation of the right parallel parking is performed in a similar manner to the case of the left parallel parking. That is, first, the seesaw switch 13 is operated, thereby the inclination of the moving guide display is made to match on the inclination of the parking space PS. In that case, when a series of the sequences of the right parallel parking is completed at step S19, the CPU 214 writes the inclination angle of the moving guide display in this sequence on the memory (not shown) used for the right parallel parking at step S20, and calculates and stores the average value of the past inclination angles. The average value of the inclination angle is used in the sequence of the next right parallel parking.

Note that, when selecting "learning of parallel parking not-needed" at step S11, the moving guide display such as shown in FIG. 14, which is displayed upright with the inclination angle 0°, is represented at step S21. At step S22, a series of the sequences of the parallel parking is performed, to thereby complete the processing.

In Embodiment 8, the steering angle of the steering wheel 7, by which it is judged whether the direction of parallel parking is a right one or not, is not limited to 45° in a right direction. The other value may be also applicable.

Embodiment 9

Figure 18:
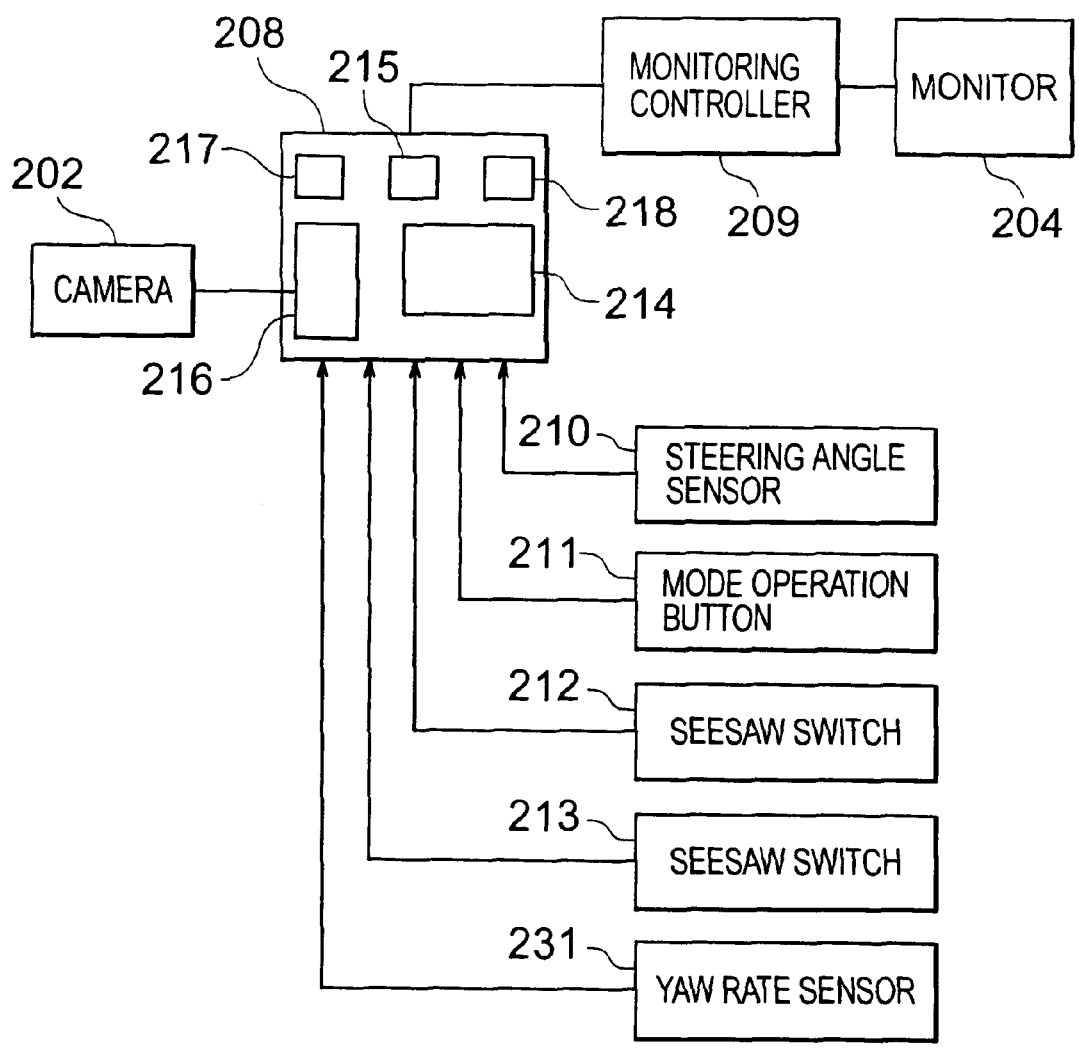
FIG. 18 is a block diagram showing a structure of a vehicle backward movement assisting apparatus according to Embodiment 9.

FIG. 18 shows the structure of the vehicle backward movement assisting apparatus during parallel parking operation according to Embodiment 9. The vehicle backward movement assisting apparatus, in the apparatus of Embodiment 6 shown in FIG. 9, is provided with a yaw rate sensor 231 at the vehicle 201. The yaw rate sensor 231 is connected to the image processor 208. Note that, the image processor 208 is equipped with a memory used for the left parallel parking and a memory for the right parallel parking.

Figure 19:
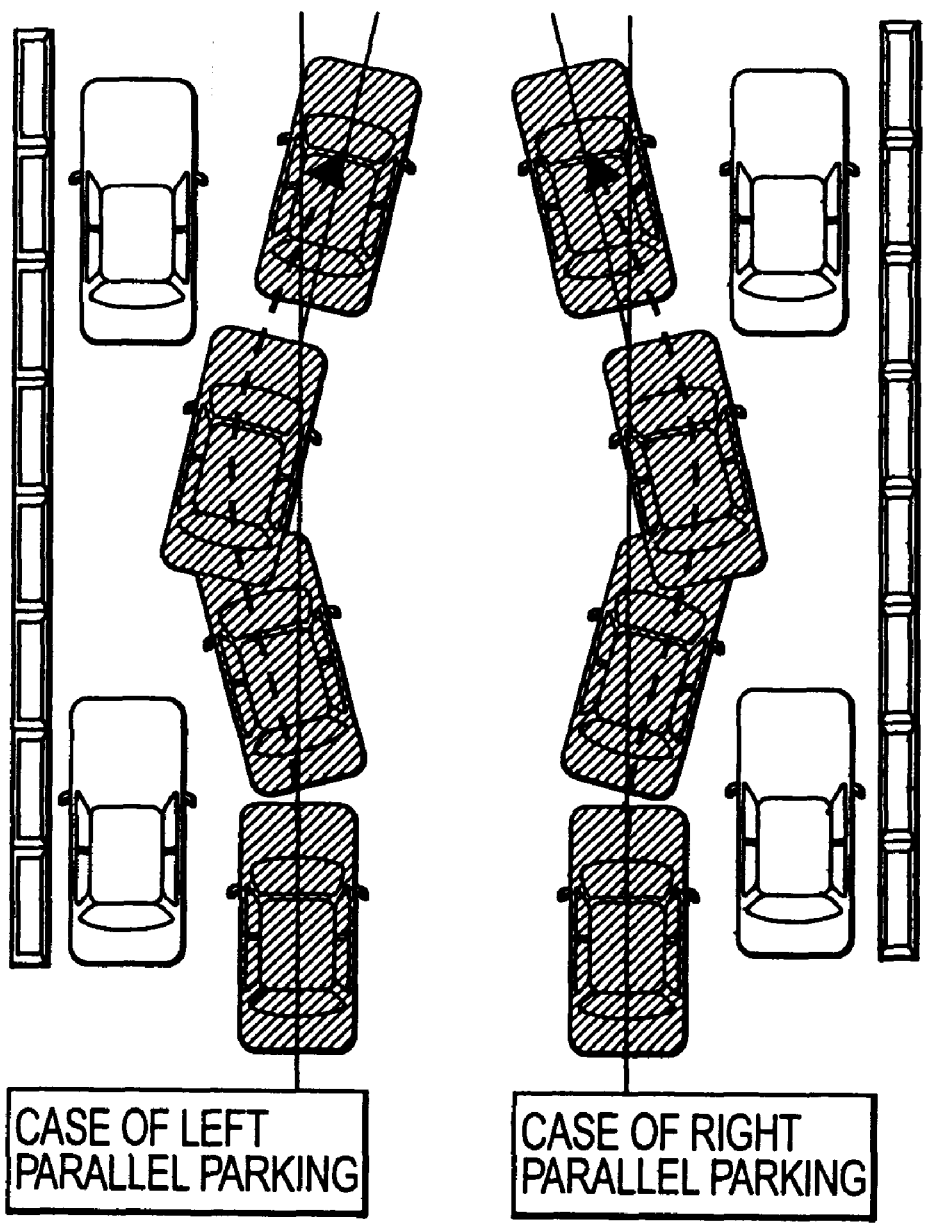
FIG. 19 is a diagram showing the travel locus of a vehicle according to Embodiment 9.

As shown in FIG. 19, the travel locus of the vehicle 201 generally differs between the left parallel parking and the right parallel parking. Therefore, the direction of parallel parking is judged based on the angle changes of the vehicle 201.

Figure 20:
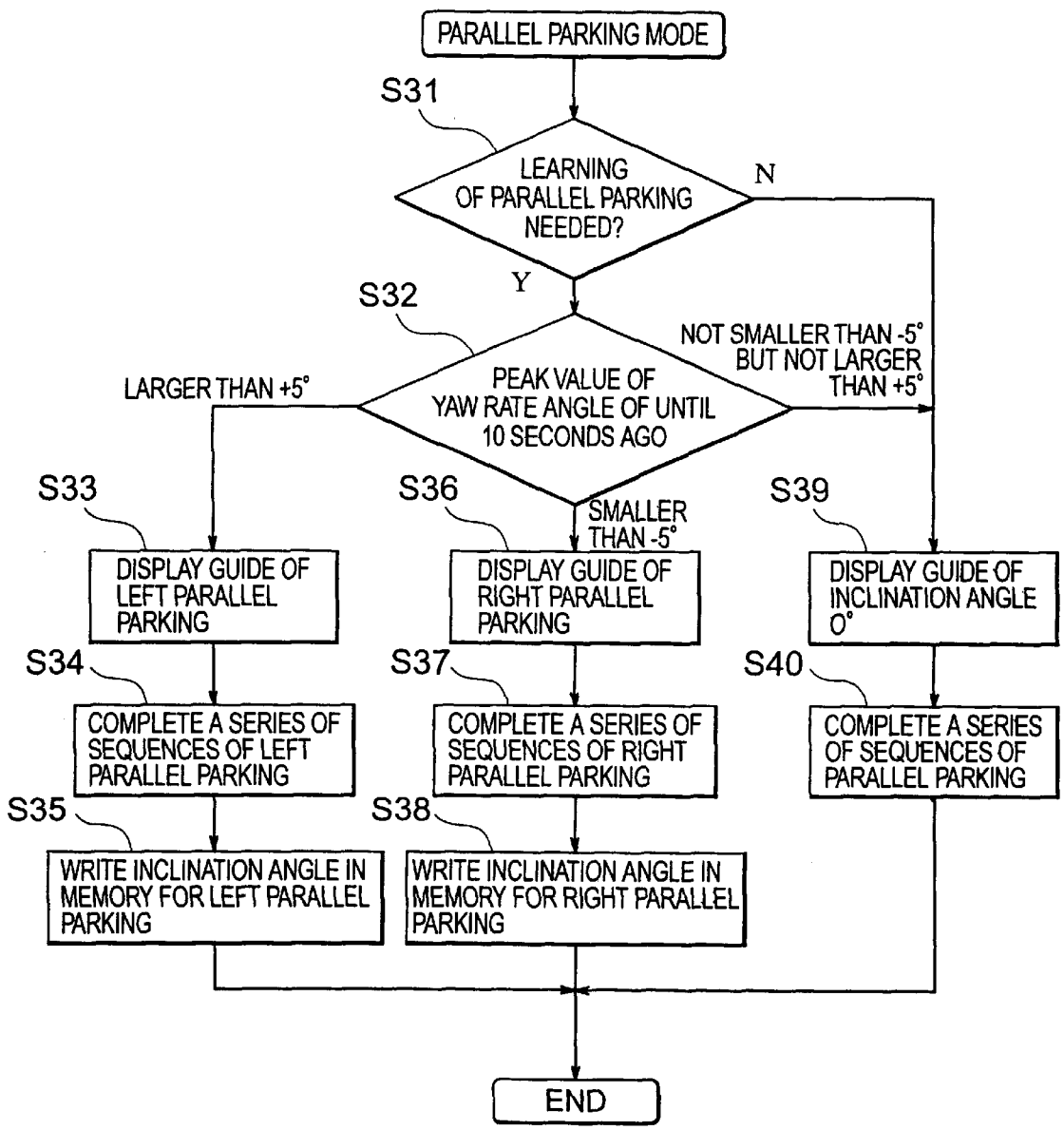
FIG. 20 is a flowchart showing operations according to Embodiment 9.

The operation of the vehicle backward movement assisting apparatus according to Embodiment 9 will be described with reference to a flowchart shown in FIG. 20.

First, the vehicle 201 is stopped at a position inclined with respect to the parking space PS. The parallel parking mode is selected by the mode operation button 211 and "learning of parallel parking needed" is selected at step S31.

The CPU 214 obtains the peak value of the yaw rate angle for a predetermined time period before stopping a vehicle during parallel parking operation, for example, until 10 seconds before stopping the vehicle, based on the yaw rate detected by the yaw rate sensor 231.

Then, when the peak value is larger than +5°, it is judged that the direction of parallel parking is a left one. At step S33, the past average inclination angle, which is stored in the memory (not shown) used for the left parallel parking, is read out, and the vehicle space mark 220 and the parallel parking guide lines 221 to 214 are displayed on the screen of the monitor 204 so as to be superimposed on the image picked up by the camera 202 in accordance with the inclination angle.

At the next step S34, a series of the sequences of the left parallel parking is completed. At step S35, the CPU 214 writes the inclination angle of the moving guide display in this sequence in the memory (not shown) used for the left parallel parking, and calculates and stores the average value of the past inclination angles. The average value of the inclination angle is used in the sequence of the next left parallel parking.

At step S32, when the peak value is smaller than −5°, it is judged that the direction of parallel parking is a right one. At step S36, the past average inclination angle, which is stored in the memory (not shown) used for the right parallel parking, is read out, and the vehicle space mark 220 and the parallel parking guide lines 221 to 214 are displayed on the screen of the monitor 204 so as to be superimposed on the image picked up by the camera 202 in accordance with the inclination angle.

At the next step S37, a series of the sequences of the right parallel parking is completed. At step S38, the CPU 214 writes the inclination angle of the moving guide display in this sequence in the memory (not shown) used for the right parallel parking and calculates and stores the average value of the past inclination angles. This average value of the inclination angle is used in the sequence of the next right parallel parking.

Additionally, at step S32, when the peak value of the yaw rate angle is −5° or larger but +5° or smaller, the direction of parallel parking cannot be judged. Therefore, the moving guide display such as shown in FIG. 14, which is represented upright with the inclination angle 0° is displayed at step S39. At step S40, a series of the sequences of parallel parking is performed, to thereby complete the processing.

Note that, even when "learning of parallel parking not-needed" is selected at step S31, the operation proceeds to step S39 and step S40, to thereby complete the processing.

Incidentally, the predetermined time required for stopping a vehicle during parallel parking operation is not limited to 10 seconds before stopping the vehicle. However, it is preferable that the predetermined time is set to be from about 5 seconds to 10 seconds.

Also, the peak value of the yaw rate angle for judging whether the direction of parallel parking is a right one or a left one is not limited to +5° and −5°. The other value may be also applicable.

Figure 21:
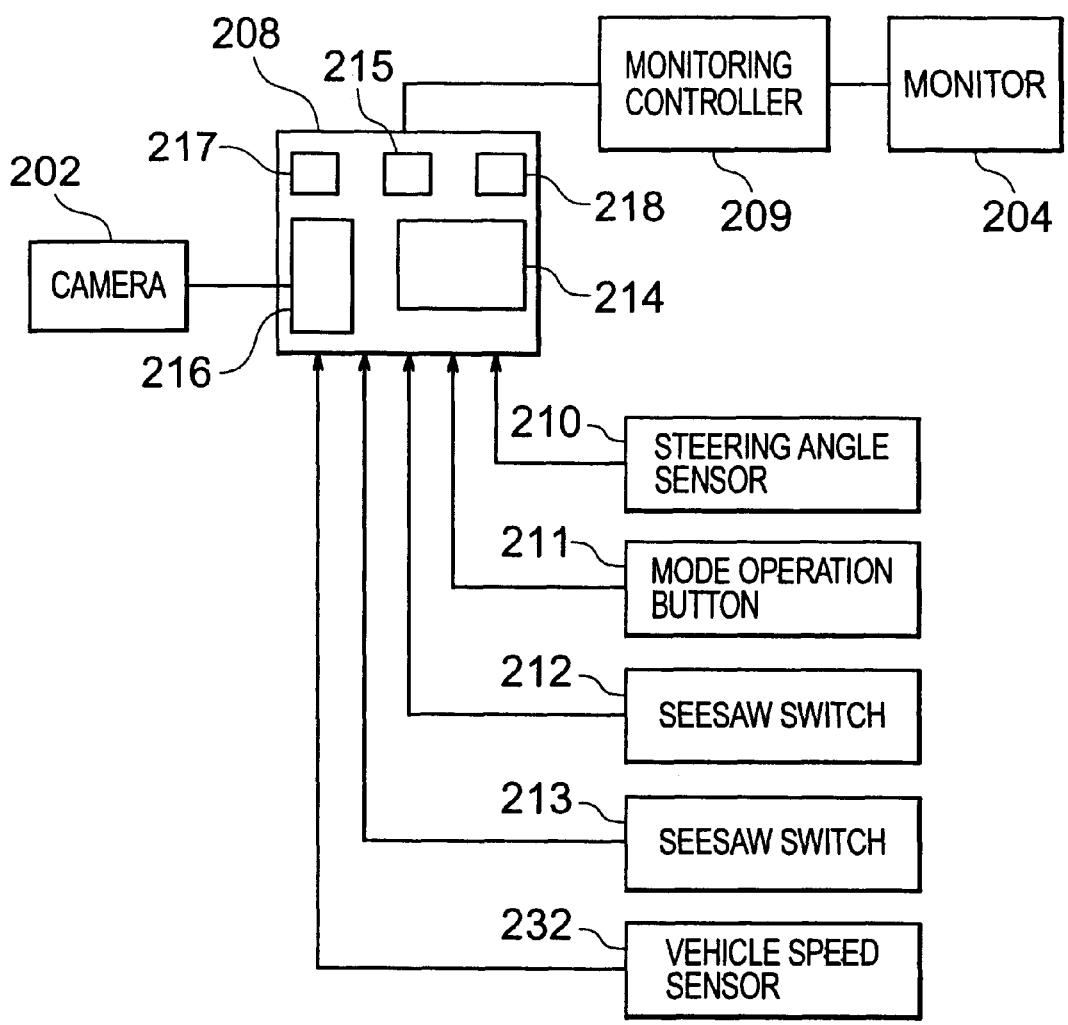
FIG. 21 is a block diagram showing the structure of the vehicle backward movement assisting apparatus in accordance with a modified example of Embodiment 9.

Note that, as shown in FIG. 21, when the vehicle 201 is equipped with a vehicle speed sensor 232 instead of the yaw rate sensor 231, and the angle changes of the vehicle 201 in the predetermined time required for stopping a vehicle during parallel parking operation is obtained from the steering angle detected by the steering angle sensor 210 and the vehicle speed detected by the vehicle speed sensor 232, the judgment whether the direction of parallel parking is a right one or a left one can also be conducted. Further, when the vehicle 201 is equipped with a distance sensor, instead of the vehicle speed sensor 232, the judgment whether the direction of parallel parking is a right one or a left one can be conducted based on the angle changes of the vehicle 201.

Incidentally, in the above-described Embodiments 6 to 9, the average value of the inclination angle may be the average value for all the parallel parkings that have been performed in the past or the average value for the last predetermined number of parallel parking performed in the past.

As described above, according to the vehicle backward movement assisting apparatus of the present invention according to claims 1 to 5, even in the state where a vehicle is stopped at a position inclined with respect to the target parking space, the guide display based on the turn angle is provided, whereby a driver can easily park the vehicle.

According to the vehicle backward movement assisting apparatus according to claim 6, the rear view of a vehicle picked up by the camera during the backward movement of the vehicle is displayed on the monitor, and therewith the moving guide display and the fixed guide display are represented as the guide display during parallel parking so as to be superimposed on the screen of the monitor, and the past rotation angle of the moving guide display by the second switch is learned and stored, and then the moving guide display is represented on the screen of the monitor at the stored rotation angle. Therefore, the steering timing and the steering amount appropriate to each driver are guided and the driver can park a vehicle with ease and high accuracy.

According to the vehicle backward movement assisting apparatus according to claim 7, in the position where a vehicle is stopped, the second switch is operated so that the inclination of the parallel parking guide lines and the inclination of the vehicle space mark are made to match the target angle with respect to the parking space on the screen of the monitor, and thereafter the first switch is operated so that the parallel parking guide lines are superimposed on the target positions of the parking space, and the steering wheel is turned until the vehicle space mark is superimposed on the vehicle space. Then, the vehicle is moved backward while retaining the steering wheel in that state, and the vehicle is stopped at the position where the eye mark is superimposed on the target point, and then the vehicle is moved backward during a static turn by making the steering angle maximum in a reverse direction. With only the above operations, the parallel parking to the parking space can be completed.

According to the vehicle backward movement assisting apparatus according to claim 8, when either of the left parallel parking or the right parallel parking is selected by the selection switch, the moving guide display and the fixed guide display used for the selected parallel parking are represented on the screen of the monitor. Therefore, each of the left parallel parking and the right parallel parking is learned, whereby it become easier to perform parallel parking in both cases.

According to the vehicle backward movement assisting apparatus according to claim 9, first the moving guide display and the fixed guide display used for either of the left parallel parking or the right parallel parking are displayed with a higher priority on the monitor screen, and thereafter the judgment whether the direction of parallel parking is a right one or a left one is performed based on the value detected by the steering angle sensor. In the case where the direction of parallel parking thus judged is different from that in the moving guide display and the fixed guide display which are first displayed, the moving guide display and the fixed guide display are changed to one used for the other direction. Therefore, by only steering the steering wheel, the judgment whether the direction of parallel parking is a right one or a left one is automatically performed and each of the left parallel parking and the right parallel parking is learned, whereby it becomes easier to perform parallel parking in both cases.

According to the vehicle backward movement assisting apparatus according to claim 10, the judgment whether the direction of parallel parking is a right one or a left one is performed based on the angle changes of a vehicle during a predetermined time before stopping the vehicle for parallel parking on the basis of the yaw rate detected by the yaw rate sensor. The moving guide display and the fixed guide display for the parallel parking in the judged direction are displayed on the screen of the monitor. Therefore, the judgment whether the direction of parallel parking is a right one or a left one is automatically performed, and each of the left parallel parking and the right parallel parking is learned, whereby it becomes easier to perform parallel parking in both cases.

What is claimed is:

1. A vehicle backward movement assisting apparatus during parking comprising:

a camera for picking up the rear view of a vehicle;

a monitor disposed at the driver's seat;

a recognizing means for recognizing a start of turn of the vehicle;

a detecting means for detecting a turn angle of the vehicle after the start of turn;

means for indicating an acquisition of a turn angle, said means also indicating a time for detecting the turn angle; and means for controlling the monitor to display an image from the camera, while the vehicle is moving backward, and to superimposedly display, on the monitor, a guide display based on the detected turn angle, for assisting the vehicle in a backward movement during parking, wherein the means for controlling the monitor guides a steering amount, determined based on a positional relationship between said guide display and a target parking space, obtained as an image from the camera.

2. A vehicle backward movement assisting apparatus according to claim 1, characterized in that the recognizing means is composed of means for detecting the rotation speed difference between a right wheel and a left wheel, a vehicle speed sensor, a steering angle sensor or a dedicated button.

3. A vehicle backward movement assisting apparatus according to claim 1, characterized in that the means for detecting a turn angle is composed of a yaw rate sensor, a steering angle sensor, a travel distance sensor or a geomagnetism sensor.

4. A vehicle backward movement assisting apparatus according to claim 1, characterized in that the means for indicating an acquisition of a turn angle is composed of a shift lever or a dedicated button.

5. A vehicle backward movement assisting apparatus during parking according to claim 1, characterized in that the guide display representing a display used for parallel parking includes:

a parallel parking guide line displayed on the screen of the monitor in accordance with the detected turn angle;

a vehicle space mark displayed so as to be moved along on the parallel parking guide line on the screen of the monitor in accordance with a steering angle of a steering wheel; and an eye mark which is displayed so as to be fixed at a predetermined position of the screen of the monitor, and which guides the turn point of the steering wheel.

6. A vehicle backward movement assisting apparatus during parallel parking, characterized by comprising:

a camera for picking up the rear view of a vehicle;

a monitor disposed at a driver's seat;

a steering angle sensor for detecting a steering angle of a steering wheel;

means for controlling a display, for displaying the image by the camera on the monitor while the vehicle is moving backward, and for superimposedly displaying on the screen of the monitor a guide display for assisting the vehicle drive during parking operation; and a first switch and a second switch which are disposed at the driver's seat of the vehicle, and by which a moving guide display on the screen of the monitor is moved in parallel and rotated, respectively, characterized in that: the moving guide display includes a parallel parking guide line and a vehicle space mark displayed so as to be moved along on the parallel parking guide line in accordance with the steering angle of the steering wheel detected by the steering angle sensor; and a fixed guide display includes an eye mark, which is fixedly displayed at a predetermined position on the screen of the monitor and which guides a return point of the steering wheel; and the means for controlling a display learns and stores a past rotation angle of the moving guide display made by the second switch and represents the moving guide display on the screen of the monitor at the stored rotation angle.

7. A vehicle backward movement assisting apparatus during parallel parking according to claim 6, characterized in that: in a position where a vehicle is stopped, the second switch is operated so that an inclination of the parallel parking guide line and an inclination of the vehicle space mark are superimposed on a target regarding a parking space on the screen of the monitor; thereafter, the switch is operated so that the parallel parking guide line is superimposed on the target regarding the parking space on the screen of the monitor; the steering wheel is returned so that the vehicle space mark is superimposed on the parking space; the vehicle is moved backward while retaining the steering wheel at that position, and the vehicle is stopped at the position where the eye mark is superimposed on the parking space; and then the vehicle is moved backward during a static turn so that the steering angle of the steering wheel becomes maximum in a reverse direction, whereby the vehicle is appropriately parked in tandem at the parking space.

8. A vehicle backward movement assisting apparatus during parallel parking according to claim 6, comprising a right-or-left selection switch disposed at the driver's seat of the vehicle, for selecting one of a right parallel parking and a left parallel parking, wherein the means for controlling a display represents the moving guide display and the fixed guide display for the parallel parking selected by the right-or-left selection switch on the screen of the monitor.

9. A vehicle backward movement assisting apparatus during parallel parking according to claim 6, comprising a yaw rate sensor for detecting the yaw rate of the vehicle, wherein the means for controlling a display judges whether a direction of parallel parking is a right one or a left one in accordance with angle changes of the vehicle, in a predetermined time required for stopping the vehicle for performing parallel parking, based on the yaw rate detected by the yaw rate sensor, and the moving guide display and the fixed guide display of parallel parking of a chosen direction are represented on the screen of the monitor.

10. A method for controlling the display of the vehicle backward movement assisting apparatus during parallel parking in the right and left directions, the vehicle backward assisting apparatus having a camera for picking up the rear view of a vehicle, a monitor disposed at a driver's seat, a steering angle sensor for detecting a steering angle of a steering wheel, means for controlling a display, for displaying the image by the camera on the monitor while the vehicle is moved backward and for superimposedly displaying on the monitor a moving guide display that moves in accordance with the steering angle of the steering wheel detected by the steering angle sensor and a fixed guide display, and a first switch and a second switch which are disposed at the driver's seat of the vehicle, and by which a moving guide display on the screen of the monitor is moved in parallel and rotated, respectively, characterized in that the moving guide display includes a parallel parking guide line and a vehicle space mark displayed so as to be moved along on the parallel parking guide line in accordance with the steering angle of the steering wheel detected by the steering angle sensor, and the fixed guide display includes an eye mark, which is fixedly displayed at a predetermined position on the screen of the monitor and which guides a return point of the steering wheel, and the means for controlling a display learns and stores a past rotation angle of the moving guide display made by the second switch and represents the moving guide display on the screen of the monitor at the stored rotation angle, the method comprising:

representing the moving guide display and the fixed guide display, on the monitor, for parallel parking in a preselected direction, the preselected direction being either the right direction or the left direction, the moving guide display and fixed display for the preselected direction being given a priority; thereafter judging whether the direction of parallel parking is in the right or the left direction, based on the steering angle detected by the steering angle sensor; and representing, on the monitor, the moving guide display and the fixed guide display for a direction which is opposite to the preselected direction being given a priority, when the direction judged by the above judging is different from the preselected direction being given a priority.

11. A vehicle backward movement assisting apparatus during parking comprising:

a camera for picking up the rear view of a vehicle;

a monitor disposed at the driver's seat;

a recognizing means for recognizing a start of turn of the vehicle;

a detecting means for detecting a turn angle of the vehicle after the start of turn;

means for indicating an acquisition of a turn angle, said means also indicating a time for detecting the turn angle detected by the detecting means; and means for controlling the monitor to display an image from the camera, while the vehicle is moving backward, and to superimposedly display, on the monitor, a guide display based on the detected turn angle, for assisting the vehicle in a backward movement during parking, wherein the guide display assists the vehicle drive so that a travel locus of the vehicle, from a start of a parking operation to a completion of a parking operation, is a combination of a plurality of arcs having constant radii, circumscribing each other wherein an intersection point of two corresponding arcs, is positioned on a line segment that connects two corresponding centers of curvature of said two arcs, and the travel locus has at least one of said intersection point.

* * * * *

UNITED STATES PATENT AND TRADEMARK OFFICE
CERTIFICATE OF CORRECTION

PATENT NO.   : 6,704,653 B2  
DATED        : March 9, 2004  
INVENTOR(S)  : Hisashi Kuriya Page 1 of 1

It is certified that error appears in the above-identified patent and that said Letters Patent is hereby corrected as shown below:

<u>Column 9,</u>  
Line 2, please delete "$Tpy=(Rc+Rm) - \sin \beta + Rc \cdot \sin |\phi|$" and substitute therefore -- $Tpy=(Rc+Rm) \cdot \sin \beta + Rc \cdot \sin |\phi|$ --

Signed and Sealed this

Sixth Day of July, 2004

JON W. DUDAS  
*Acting Director of the United States Patent and Trademark Office*